US012574881B2

(12) United States Patent
Zhang et al.

(10) Patent No.: US 12,574,881 B2
(45) Date of Patent: Mar. 10, 2026

(54) VARIOUS USES OF UPLINK MEASUREMENT SIGNALS IN A NEW RADIO SYSTEM

(71) Applicant: HUAWEI TECHNOLOGIES CO., LTD., GuangDong (CN)

(72) Inventors: Lili Zhang, Beijing (CN); Xizeng Dai, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 18/157,984

(22) Filed: Jan. 23, 2023

(65) Prior Publication Data

US 2023/0164723 A1     May 25, 2023

Related U.S. Application Data

(63) Continuation of application No. PCT/CN2021/108591, filed on Jul. 27, 2021.

(30) Foreign Application Priority Data

Jul. 27, 2020    (CN) .......................... 202010733726.1

(51) Int. Cl.
*H04W 56/00*        (2009.01)
*H04B 17/309*       (2015.01)
(Continued)

(52) U.S. Cl.
CPC ... *H04W 56/0045* (2013.01); *H04W 74/0833* (2013.01)

(58) Field of Classification Search
None
See application file for complete search history.

(56) References Cited

U.S. PATENT DOCUMENTS 5,574,974 A  * 11/1996  Almgren ............. H04W 52/346
                                                        455/524
9,338,772 B2 *  5/2016  Etemad ................. H04W 72/20
(Continued)

FOREIGN PATENT DOCUMENTS

CN       102149208 A    8/2011
CN       109451868 A    3/2019
WO    2017027055 A1    2/2017

*Primary Examiner* — Jenee Holland
(74) *Attorney, Agent, or Firm* — Rimon PC

(57)        ABSTRACT

Embodiments of this application disclose a communication method and apparatus. The method includes that a terminal device sends a first uplink signal to a first network device on at least one first carrier. The method further includes that the first network device detects the first uplink signal on the at least one first carrier, determines an active carrier based on determined signal strength of the first uplink signal on the at least one first carrier, and sends first feedback information to the terminal device. The first feedback information includes information about the active carrier in the at least one first carrier. A corresponding apparatus is further provided. In this way, the signal strength of the first uplink signal sent by the terminal device on the at least one first carrier is determined, to accurately determine the information about the active carrier in the at least one first carrier.

20 Claims, 10 Drawing Sheets

(51) Int. Cl.

| | |
|---|---|
| *H04B 17/318* | (2015.01) |
| *H04B 17/382* | (2015.01) |
| *H04W 24/02* | (2009.01) |
| *H04W 24/08* | (2009.01) |
| *H04W 74/0833* | (2024.01) |

(56) References Cited

U.S. PATENT DOCUMENTS

| | | | | |
|---|---|---|---|---|
| 10,299,278 B1* | 5/2019 | Jorgovanovic | .... | H04W 28/0284 |
| 10,694,409 B2* | 6/2020 | Ryu | ...................... | H04W 74/04 |
| 2006/0233138 A1* | 10/2006 | Park | ...................... | H04W 24/00 |
| | | | | 370/254 |
| 2007/0140102 A1* | 6/2007 | Oh | ........................... | H04L 5/006 |
| | | | | 370/335 |
| 2009/0149171 A1* | 6/2009 | Arpee | .................. | H04B 17/309 |
| | | | | 455/423 |
| 2009/0300456 A1* | 12/2009 | Pelletier | ................ | H04L 5/0005 |
| | | | | 714/748 |
| 2010/0265927 A1* | 10/2010 | Shearer, III | ........ | H04L 27/2626 |
| | | | | 370/343 |
| 2011/0034175 A1* | 2/2011 | Fong | ..................... | H04L 1/0077 |
| | | | | 455/450 |
| 2011/0170535 A1* | 7/2011 | Wang | ................ | H04W 56/0045 |
| | | | | 370/350 |
| 2011/0249656 A1* | 10/2011 | Cai | ....................... | H04L 5/0053 |
| | | | | 370/336 |
| 2011/0292812 A1* | 12/2011 | Kim | ..................... | H04W 52/34 |
| | | | | 370/242 |
| 2012/0076039 A1* | 3/2012 | Kwon | ................. | H04B 7/0634 |
| | | | | 370/252 |
| 2012/0106450 A1* | 5/2012 | Golitschek Edler Von | | |
| | | Elbwart | ................ | H04L 1/0025 |
| | | | | 370/328 |
| 2012/0155408 A1* | 6/2012 | Pedersen | .............. | H04L 1/0026 |
| | | | | 370/329 |
| 2012/0320874 A1 | 12/2012 | Li et al. | | |
| 2013/0010619 A1* | 1/2013 | Fong | ................. | H04W 72/0453 |
| | | | | 370/252 |
| 2013/0010744 A1* | 1/2013 | Kang | ................... | H04B 7/0645 |
| | | | | 370/329 |
| 2013/0044657 A1* | 2/2013 | Oh | .................... | H04W 74/0875 |
| | | | | 370/310 |
| 2013/0051214 A1* | 2/2013 | Fong | ................... | H04W 36/302 |
| | | | | 370/216 |
| 2013/0094392 A1* | 4/2013 | Kim | ...................... | H04L 1/0026 |
| | | | | 370/252 |
| 2013/0188619 A1* | 7/2013 | Dinan | .............. | H04W 56/0045 |
| | | | | 370/336 |
| 2013/0201916 A1* | 8/2013 | Kummetz | .............. | H04L 43/18 |
| | | | | 370/328 |
| 2013/0301424 A1* | 11/2013 | Kotecha | ................ | H04L 65/611 |
| | | | | 370/242 |
| 2014/0003269 A1* | 1/2014 | Golitschek Edler von Elbwart | ... | |
| | | | | H04W 24/10 |
| | | | | 370/252 |
| 2014/0329533 A1* | 11/2014 | Bergman | ............. | H04W 48/08 |
| | | | | 455/450 |
| 2015/0257155 A1* | 9/2015 | Wijetunge | ............ | H04W 72/51 |
| | | | | 370/329 |
| 2015/0296525 A1* | 10/2015 | Kim | ...................... | H04W 72/21 |
| | | | | 370/329 |
| 2015/0305035 A1* | 10/2015 | Hu | ....................... | H04B 1/0458 |
| | | | | 370/329 |
| 2015/0351106 A1* | 12/2015 | Wijetunge | ............ | H04W 72/54 |
| | | | | 370/329 |
| 2016/0088631 A1* | 3/2016 | Hedayat | ................. | H04B 7/063 |
| | | | | 370/329 |
| 2016/0119846 A1* | 4/2016 | Chou | .................. | H04W 72/541 |
| | | | | 370/331 |
| 2016/0165608 A1* | 6/2016 | Kim | ...................... | H04W 16/32 |
| | | | | 370/329 |
| 2016/0242061 A1* | 8/2016 | Harada | ................. | H04L 5/0073 |
| 2016/0242091 A1* | 8/2016 | Krishnamoorthy | ... | H04W 76/15 |
| 2017/0094701 A1* | 3/2017 | Hong | ................... | H04W 76/11 |
| 2018/0034525 A1* | 2/2018 | Park | ..................... | H04B 7/0456 |
| 2019/0174378 A1* | 6/2019 | Chang | ................... | H04L 5/001 |
| 2020/0044720 A1* | 2/2020 | Venugopal | ............ | H04W 24/10 |
| 2020/0120458 A1* | 4/2020 | Aldana | ................. | H04W 28/22 |
| 2020/0214025 A1* | 7/2020 | Chen | ................... | H04L 5/0094 |
| 2020/0305200 A1* | 9/2020 | Jiang | ................... | H04W 52/50 |
| 2021/0307022 A1* | 9/2021 | Nguyen | ............... | H04L 5/0094 |
| 2022/0103308 A1* | 3/2022 | Lin | ...................... | H04L 1/1861 |
| 2022/0140972 A1* | 5/2022 | Yang | ................... | H04L 1/1887 |
| | | | | 370/329 |
| 2023/0069144 A1* | 3/2023 | Wang | ................... | H04L 5/0055 |

* cited by examiner

Cell Cell#A@700MHz

Cell Cell#B@4.9GHz

201

First network
device

202

Second network
device

203

Terminal device

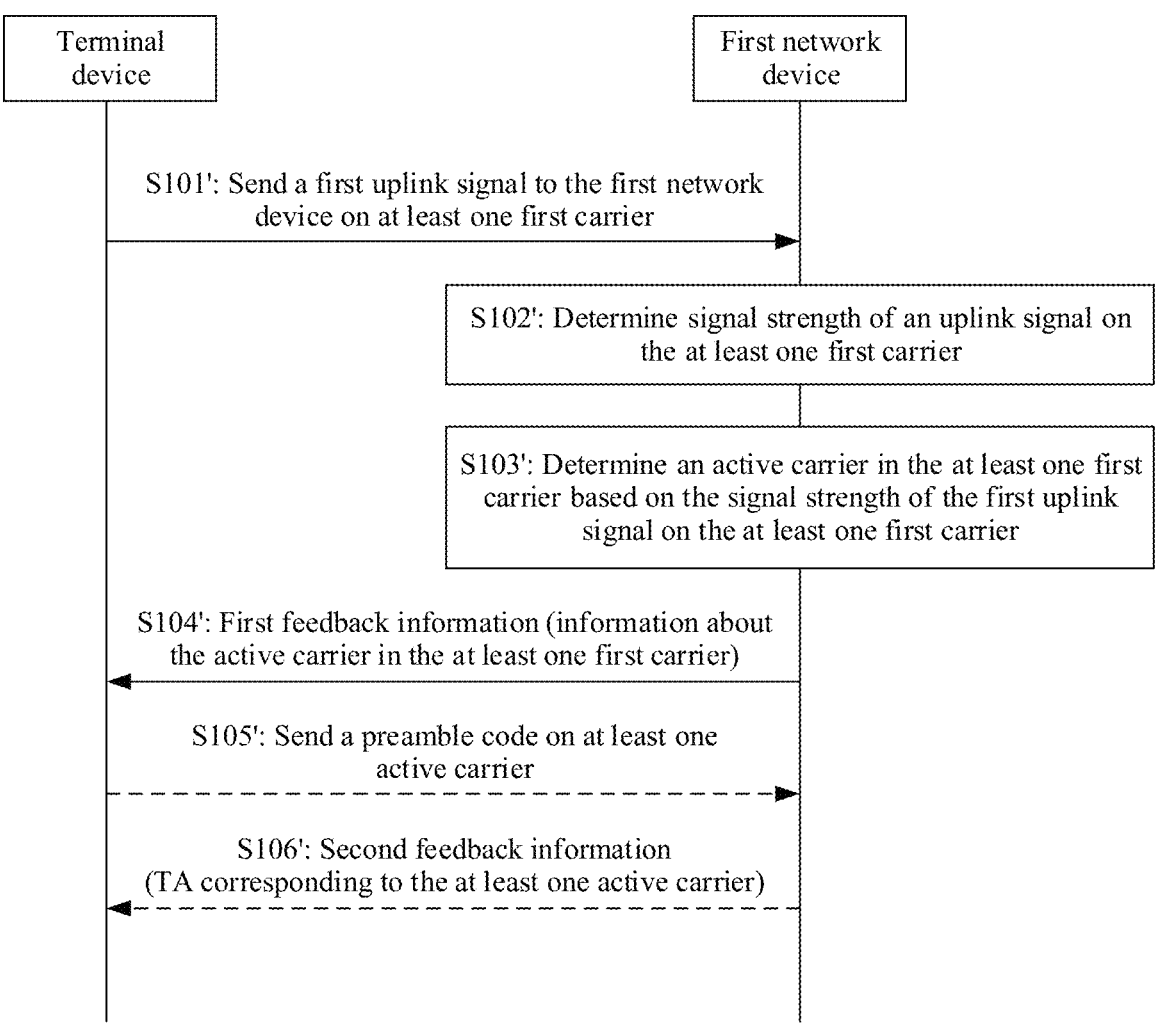

| Terminal device | | First network device |
| --- | --- | --- |

S101': Send a first uplink signal to the first network device on at least one first carrier S102': Determine signal strength of an uplink signal on the at least one first carrier S103': Determine an active carrier in the at least one first carrier based on the signal strength of the first uplink signal on the at least one first carrier S104': First feedback information (information about the active carrier in the at least one first carrier)

S105': Send a preamble code on at least one active carrier

S106': Second feedback information (TA corresponding to the at least one active carrier)

FIG. 5

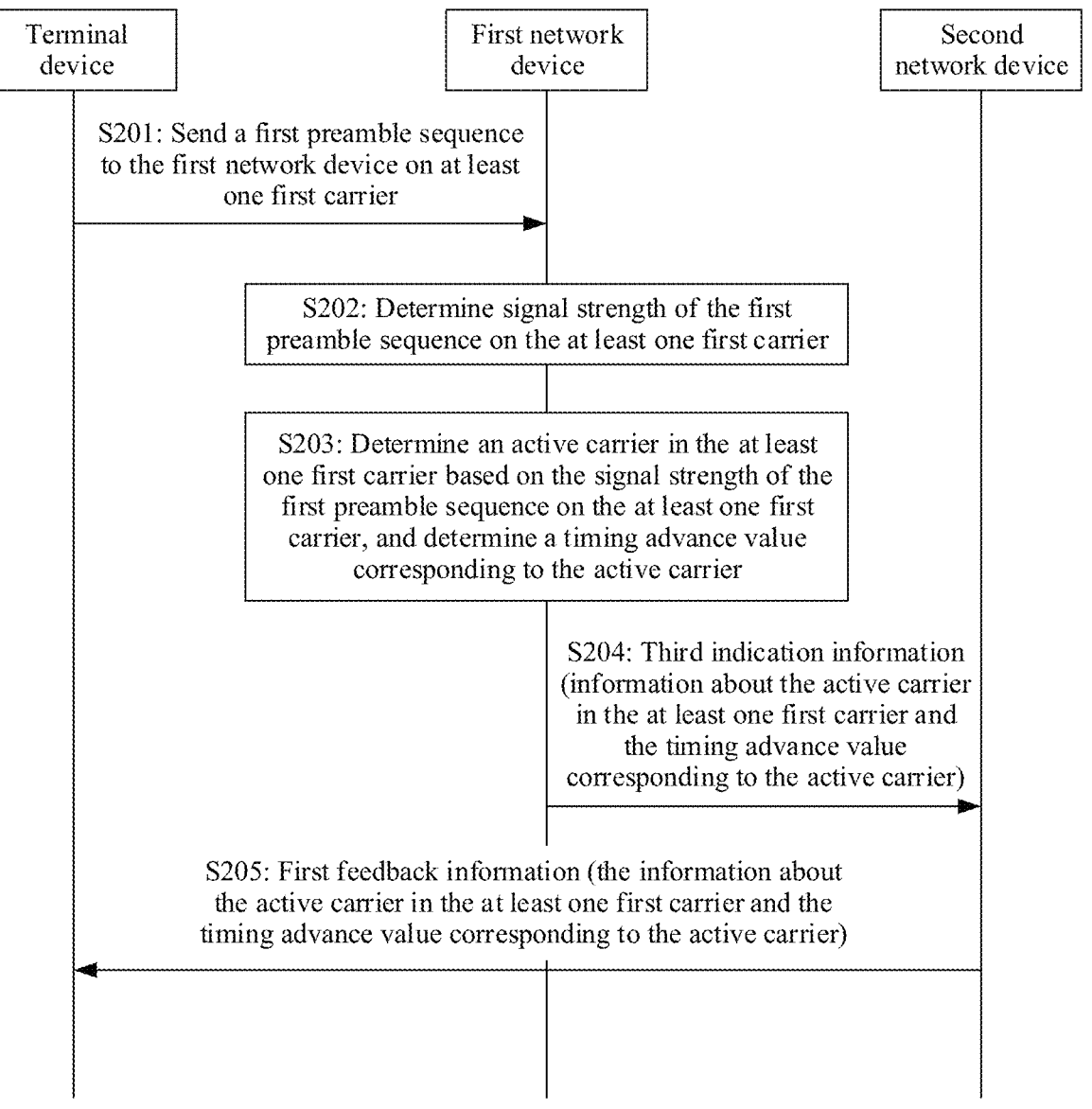

| Terminal device | First network device | Second network device |

S201: Send a first preamble sequence to the first network device on at least one first carrier S202: Determine signal strength of the first preamble sequence on the at least one first carrier S203: Determine an active carrier in the at least one first carrier based on the signal strength of the first preamble sequence on the at least one first carrier, and determine a timing advance value corresponding to the active carrier S204: Third indication information (information about the active carrier in the at least one first carrier and the timing advance value corresponding to the active carrier)

S205: First feedback information (the information about the active carrier in the at least one first carrier and the timing advance value corresponding to the active carrier)

FIG. 6

VARIOUS USES OF UPLINK MEASUREMENT SIGNALS IN A NEW RADIO SYSTEM

CROSS-REFERENCE TO RELATED APPLICATIONS

This application is a continuation of International Application No. PCT/CN2021/108591, filed on Jul. 27, 2021, which claims priority to Chinese Patent Application No. 202010733726.1, filed Jul. 27, 2020. The disclosures of the aforementioned applications are hereby incorporated by reference in their entireties.

TECHNICAL FIELD

Embodiments of this application generally relate to the field of communication technologies, and in particular, to a communication method and apparatus.

BACKGROUND

In a fifth generation (5G) new radio (NR) communication system, uplink transmit power of a terminal device is usually limited. As a result, received signal strength of an uplink transmitted signal may be insufficient to ensure coverage performance of the uplink transmitted signal when it arrives at a base station. In addition, an uplink spectrum may also be insufficient, and therefore it is difficult or impossible to rely on retransmission of data to ensure uplink coverage performance of the uplink transmitted signal. Currently, supplementary uplink (SUL) is introduced into an NR communication system as an alternative when uplink coverage is insufficient in the NR communication system. In other words, the NR communication system supports configuration of a plurality of uplink carriers in one cell. A low frequency band of a long term evolution (LTE) communication system usually has better coverage performance. Therefore, when SUL is implemented, NR uplink transmission is performed by using a low frequency band (for example, 700 MHz, 1.8 GHz, or 2.1 GHz) of the LTE communication system. When performing NR uplink transmission by using a frequency band of the LTE communication system, the terminal device may multiplex the frequency band with uplink time division duplex (TDD) or frequency division duplex (FDD) in the LTE communication system.

In addition, a high frequency band may be considered to implement SUL. For example, a 4.9 GHz frequency band can provide a spectrum resource with a higher bandwidth, to provide more sufficient uplink resources. Therefore, uplink coverage may be expanded on the frequency band.

When SUL is implemented by using a low frequency band of the LTE communication system, the terminal device may detect signal quality on a frequency band of the NR communication system. When signal quality on the frequency band is lower than a preset threshold, the terminal device determines that the frequency band cannot meet an access requirement of the terminal device, and therefore may switch to the low frequency band of the LTE communication system for access. However, for a high frequency band, for example, a 4.9 GHz frequency band, when signal quality on a frequency band of the NR communication system is unsatisfactory, switching to the high frequency band cannot ensure that signal strength consistently meets an acceptable threshold. Therefore, a current SUL access rule is not applicable to a case of SUL implementation by using a high frequency band, and a new access mechanism needs to be designed. For example, when carriers included in a high frequency band, for example, 4.9 GHz, are uplink-only carriers or uplink-dominant carriers, how to perform effective measurement to complete effective access on the frequency band and determine an available active carrier in a plurality of carriers on the frequency band is to be resolved.

SUMMARY

Embodiments of this application provide a communication method and apparatus, to accurately determine an active carrier, and improve reliability of communication on the active carrier.

According to a first aspect, a communication method is provided. The method includes: a terminal device sends a first uplink signal to a first network device on at least one first carrier; and the terminal device receives first feedback information. The first feedback information includes information about an active carrier in the at least one first carrier. According to this aspect, signal strength of the first uplink signal sent by the terminal device on the at least one first carrier is determined, to accurately determine the information about the active carrier in the at least one first carrier. This improves reliability of communication on the active carrier.

With reference to the first aspect, in a possible implementation, the first feedback information further includes a timing advance value corresponding to the active carrier. The timing advance value corresponds to at least one active carrier, or the timing advance value is in a one-to-one correspondence with at least one active carrier, or the timing advance value corresponds to at least one active carrier group. In this implementation, in addition to being used for uplink measurement, the first uplink signal may also be used for random access. This reduces signaling overheads, and improves communication efficiency.

With reference to the first aspect, in still another possible implementation, the first uplink signal may be a sounding reference signal, a preamble code, a demodulation reference signal, a channel state information-reference signal, or any defined sequence.

With reference to the first aspect, in still another possible implementation, the first uplink signal is used for obtaining timing advance and for uplink measurement.

With reference to the first aspect, in still another possible implementation, the first feedback information is a random access response message or system information.

With reference to the first aspect, in still another possible implementation, the first uplink signal is a first preamble sequence, and the first uplink signal is used for random access and uplink measurement.

With reference to the first aspect, in still another possible implementation, the information about the active carrier further indicates that a part or all of grant-free resources on the active carrier are active. In this implementation, when activating the carrier, the terminal device triggers activation of the grant-free resource, to perform uplink transmission on the active carrier and the grant-free resource.

With reference to the first aspect, in still another possible implementation, that the terminal device receives first feedback information includes: the terminal device receives the first feedback information from a second network device; or the terminal device receives the first feedback information from the first network device. In this implementation, if the first carrier is an uplink-only carrier, the first network device may send the information about the active carrier by using the second network device; or if the first carrier is an uplink-dominant carrier, the first network device may send the information about the active carrier by using a few downlink slots.

With reference to the first aspect, in still another possible implementation, that the terminal device receives the first feedback information from the first network device includes: The terminal device receives the first feedback information from the first network device by using a first slot. The first slot is a downlink slot configured by the first network device for the terminal device.

With reference to the first aspect, in still another possible implementation, the first feedback information further includes first identification information and/or second identification information corresponding to the terminal device. The first identification information includes at least one of the following: a cell radio network temporary identifier and a sequence identifier corresponding to an uplink signal. The second identification information includes at least one of the following: a sequence identifier corresponding to the uplink signal and a resource identifier corresponding to the uplink signal.

With reference to the first aspect, in still another possible implementation, the sequence identifier corresponding to the uplink signal is a sequence identifier of the uplink signal.

With reference to the first aspect, in still another possible implementation, the first carrier belongs to a carrier in a first carrier group, and carriers in the first carrier group have a common timing advance value. In this implementation, carriers in the first carrier group have a common timing advance value, and there is no need to determine a timing advance value for each first carrier in the first carrier group one by one. This improves communication efficiency.

According to a second aspect, a communication method is provided. The method includes: a first network device detects a first uplink signal on at least one first carrier; the first network device determines signal strength of the first uplink signal on the at least one first carrier; the first network device determines an active carrier in the at least one first carrier based on the signal strength of the first uplink signal on the at least one first carrier; and the first network device sends first feedback information. The first feedback information includes information about the active carrier in the at least one first carrier. According to this aspect, the signal strength of the first uplink signal sent by the terminal device on the at least one first carrier is determined, to accurately determine the information about the active carrier in the at least one first carrier. This improves reliability of communication on the active carrier.

With reference to the second aspect, in a possible implementation, the first feedback information further includes a timing advance value corresponding to the active carrier. The timing advance value corresponds to at least one active carrier, or the timing advance value is in a one-to-one correspondence with at least one active carrier, or the timing advance value corresponds to at least one active carrier group.

With reference to the second aspect, in still another possible implementation, the first feedback information is a random access response message or system information.

With reference to the second aspect, in still another possible implementation, the first uplink signal is a first preamble sequence, and the first uplink signal is used for random access and uplink measurement.

With reference to the second aspect, in still another possible implementation, the first uplink signal is used for timing advance value obtaining and uplink measurement.

The first uplink signal includes a sounding reference signal, a preamble code, a demodulation reference signal, a channel state information-reference signal, or any defined sequence.

With reference to the second aspect, in still another possible implementation, the information about the active carrier is a first carrier determined by the first network device based on measurement of the first uplink signal.

With reference to the second aspect, in still another possible implementation, the first network device sending first feedback information includes: the first network device sends first indication information to a second network device, where the first indication information includes the information about the active carrier in the at least one first carrier; or the first network device sends the first feedback information to the terminal device.

With reference to the second aspect, in still another possible implementation, the first network device sending the first feedback information to the terminal device includes: the first network device sends the first feedback information by using a first slot. The first slot is a downlink slot configured by the first network device for the terminal device.

With reference to the second aspect, in still another possible implementation, the first feedback information further includes first identification information and/or second identification information corresponding to the terminal device. The first identification information includes at least one of the following: a cell radio network temporary identifier and a sequence identifier corresponding to an uplink signal. The second identification information includes at least one of the following: a sequence identifier corresponding to the uplink signal and a resource identifier corresponding to the uplink signal.

With reference to the second aspect, in still another possible implementation, the sequence identifier corresponding to the uplink signal is a sequence identifier of the uplink signal.

With reference to the second aspect, in still another possible implementation, the first carrier belongs to a carrier in a first carrier group, and the first carrier group has a common timing advance value.

According to a third aspect, a communication method is provided. The method includes: a terminal device detects a downlink reference signal from a first network device on at least one first carrier; the terminal device determines signal strength of the downlink reference signal; and when the signal strength of the downlink reference signal is greater than or equal to a first specified value, the terminal device sends uplink information to the first network device on a grant-free resource corresponding to an active carrier. According to this aspect, when the signal strength of the downlink reference signal is strong, the terminal device may send the uplink information to the first network device on the grant-free resource corresponding to the active carrier. This improves reliability of uplink transmission.

According to a fourth aspect, a communication method is provided. The method includes: a first network device sends a downlink reference signal on at least one first carrier; and the first network device detects the uplink information from a terminal device on a grant-free resource corresponding to an active carrier.

According to a fifth aspect, a communication method is provided. The method includes: a terminal device detects a downlink reference signal from a first network device on at least one first carrier; the terminal device determines signal strength of the downlink reference signal; and when the signal strength of the downlink reference signal is greater than a second specified value, the terminal device sends a first uplink signal to the first network device on the at least one first carrier. According to this aspect, when the signal strength of the downlink reference signal is strong, the terminal device may send an uplink measurement signal to the first network device, to avoid redundant transmission when the terminal device is far away from the first network device, and reduce power consumption of the terminal device.

With reference to the fifth aspect, in a possible implementation, the method further includes: the terminal device receives first feedback information, where the first feedback information includes information about an active carrier in the at least one first carrier. In this implementation, the first feedback information includes the information about the active carrier, and the information about the active carrier is determined by the first network device based on the signal strength of the first uplink signal, so that the terminal device can perform reliable information transmission by using the information about the active carrier.

With reference to the fifth aspect, in still another possible implementation, the first feedback information further includes second indication information. The second indication information indicates an active grant-free resource. In this implementation, the first feedback information includes the information about the active carrier and the second indication information. Therefore, when the carrier is active, information transmission on the grant-free resource may be triggered.

With reference to the fifth aspect, in still another possible implementation, the first feedback information further includes an uplink timing advance offset value. In this implementation, in addition to being used for uplink measurement, the first uplink signal may also be used for random access. This reduces signaling overheads, and improves communication efficiency.

With reference to the fifth aspect, in still another possible implementation, the method further includes: determining an initial uplink timing advance based on the downlink reference signal. In this implementation, the initial uplink timing advance may be determined based on the downlink reference signal, to avoid re-obtaining the uplink timing advance. This improves communication efficiency.

With reference to the fifth aspect, in still another possible implementation, the downlink reference signal is a physical broadcast channel, a synchronization signal block, or a channel state information-reference signal.

With reference to the fifth aspect, in still another possible implementation, the method further includes: the terminal device receives first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the terminal device receives second downlink control information, where the second downlink control information is used for triggering transmission of the first uplink signal, and the second downlink control information includes the trigger indication information. In this implementation, newly defined downlink control information is used or existing downlink control information may be multiplexed to indicate a transmission parameter for uplink measurement.

According to a sixth aspect, a communication method is provided. The method includes: a first network device sends a downlink reference signal on at least one first carrier; and the first network device detects a first uplink signal sent by a terminal device on the at least one first carrier.

With reference to the sixth aspect, in a possible implementation, the method further includes: the first network device determines signal strength of the first uplink signal on the at least one first carrier; the first network device determines an active carrier based on the signal strength of the first uplink signal on the at least one first carrier; and the first network device sends first feedback information. The first feedback information includes information about the active carrier in the at least one first carrier.

With reference to the sixth aspect, in still another possible implementation, the first network device sending first feedback information includes: The first network device sends first indication information to a second network device, where the first indication information includes the information about the active carrier in the at least one first carrier; or the first network device sends the first feedback information to the terminal device.

With reference to the sixth aspect, in still another possible implementation, the first feedback information includes second indication information. The second indication information indicates an active grant-free resource.

With reference to the sixth aspect, in still another possible implementation, the first feedback information includes an uplink timing advance offset value.

With reference to the sixth aspect, in still another possible implementation, the method further includes: the first network device sends first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the first network device sends second downlink control information, where the second downlink control information is used for triggering transmission of the first uplink signal, and the second downlink control information includes the trigger indication information.

According to a seventh aspect, a communication apparatus is provided, configured to perform the method according to any one of the first aspect or the possible implementations of the first aspect. The communication apparatus may be the terminal device according to any one of the first aspect or the possible implementations of the first aspect, or may be a module applied to a terminal device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes at least one module or unit corresponding to the foregoing functions.

With reference to the seventh aspect, in a possible implementation, the communication apparatus includes a transceiver unit (e.g., transceiver circuit). The transceiver unit is configured to send a first uplink signal to a first network device on at least one first carrier; and the transceiver unit is further configured to receive first feedback information. The first feedback information includes information about an active carrier in the at least one first carrier.

Optionally, the transceiver unit is further configured to receive the first feedback information from a second network device; or the transceiver unit is further configured to receive the first feedback information from the first network device.

Optionally, the transceiver unit is further configured to receive the first feedback information from the first network device by using a first slot. The first slot is a downlink slot configured by the first network device for the terminal device.

With reference to the seventh aspect, in still another possible implementation, the communication apparatus includes an input interface, an output interface, and a processing circuit. The output interface is configured to send a first uplink signal to a first network device on at least one first carrier; and the input interface is configured to receive first feedback information. The first feedback information includes information about an active carrier in the at least one first carrier.

Optionally, the input interface is further configured to receive the first feedback information from a second network device; or the input interface is further configured to receive the first feedback information from the first network device.

Optionally, the input interface is further configured to receive the first feedback information from the first network device by using a first slot. The first slot is a downlink slot configured by the first network device for the terminal device.

For example, the communication apparatus further includes a memory. The memory is coupled to at least one processor, and the at least one processor is configured to run program instructions stored in the memory, so that the communication apparatus performs the method according to any one of the first aspect or the possible implementations of the first aspect.

In a possible implementation, the memory is configured to store program instructions and data. The memory is coupled to the at least one processor, and the at least one processor may invoke and execute the program instructions stored in the memory, so that the communication apparatus performs the method according to any one of the first aspect or the possible implementations of the first aspect.

For example, the communication apparatus further includes a communication interface. The communication interface is used by the communication apparatus to communicate with another device. When the communication apparatus is a terminal, the communication interface is a transceiver, an input/output interface, a circuit, or the like.

In a possible implementation, the communication apparatus includes at least one processor and a communication interface, configured to perform the method according to any one of the first aspect or the possible implementations of the first aspect. The at least one processor is configured to communicate with outside through the communication interface. The at least one processor is configured to run a computer program, so that the communication apparatus performs the method according to any one of the first aspect or the possible implementations of the first aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the seventh aspect, refer to technical effects brought by different design manners in the first aspect. Details are not described herein again.

According to an eighth aspect, a communication apparatus is provided, configured to perform the method according to any one of the second aspect or the possible implementations of the second aspect. The communication apparatus may be the first network device according to any one of the second aspect or the possible implementations of the second aspect, or a module applied to a first network device, for example, a chip or a chip system. The communication apparatus includes a corresponding module, unit, or means for performing the foregoing methods. The module, unit, or means may be implemented by using hardware (e.g., circuit) or software, or may be implemented by using hardware executing corresponding software. The hardware or the software includes at least one module or unit corresponding to the foregoing functions.

With reference to the eighth aspect, in a possible implementation, the communication apparatus includes a transceiver unit and a processing unit. The processing unit is configured to detect a first uplink signal on at least one first carrier; the processing unit is further configured to determine signal strength of the first uplink signal on the at least one first carrier; the processing unit is further configured to determine an active carrier in the at least one first carrier based on the signal strength of the first uplink signal on the at least one first carrier; and the transceiver unit is configured to send first feedback information. The first feedback information includes information about the active carrier in the at least one first carrier.

Optionally, the transceiver unit is further configured to send first indication information to a second network device, where the first indication information includes the information about the active carrier in the at least one first carrier; or the transceiver unit is further configured to send the first feedback information to a terminal device.

Optionally, the transceiver unit is further configured to send the first feedback information by using a first slot. The first slot is a downlink slot configured by the first network device for the terminal device.

With reference to the eighth aspect, in still another possible implementation, the communication apparatus includes an input interface, an output interface, and a processing circuit. The processing circuit is configured to detect a first uplink signal on at least one first carrier; the processing circuit is further configured to determine signal strength of the first uplink signal on the at least one first carrier; the processing circuit is further configured to determine an active carrier in the at least one first carrier based on the signal strength of the first uplink signal on the at least one first carrier; and the output interface is configured to send first feedback information. The first feedback information includes information about the active carrier in the at least one first carrier.

Optionally, the output interface is further configured to send first indication information to a second network device, where the first indication information includes the information about the active carrier in the at least one first carrier; or the output interface is further configured to send the first feedback information to a terminal device.

Optionally, the output interface is further configured to send the first feedback information by using a first slot. The first slot is a downlink slot configured by the first network device for the terminal device.

For example, the communication apparatus further includes a memory. The memory is coupled to at least one processor, and the at least one processor is configured to run program instructions stored in the memory, so that the communication apparatus performs the method according to any one of the second aspect or the possible implementations of the second aspect.

In a possible implementation, the memory is configured to store program instructions and data. The memory is coupled to the at least one processor, and the at least one processor may invoke and execute the program instructions stored in the memory, so that the communication apparatus performs the method according to any one of the second aspect or the possible implementations of the second aspect.

For example, the communication apparatus further includes a communication interface. The communication interface is used by the communication apparatus to communicate with another device. When the communication apparatus is an access network device, the communication interface is a transceiver, an input/output interface, a circuit, or the like.

In a possible design, the communication apparatus includes at least one processor and a communication interface, configured to perform the method according to any one of the second aspect or the possible implementations of the second aspect. The at least one processor communicates with outside through the communication interface. The at least one processor is configured to run a computer program, so that the communication apparatus performs the method according to any one of the second aspect or the possible implementations of the second aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the eighth aspect, refer to technical effects brought by different design manners in the second aspect. Details are not described herein again.

According to a ninth aspect, a communication apparatus is provided, configured to perform the method according to any one of the third aspect or the possible implementations of the third aspect. The communication apparatus may be the terminal device according to any one of the third aspect or the possible implementations of the third aspect, or may be a module applied to a terminal device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes at least one module or unit corresponding to the foregoing functions.

With reference to the ninth aspect, in a possible implementation, the communication apparatus includes a processing unit (e.g., processing circuit) and a transceiver unit. The processing unit is configured to detect a downlink reference signal from a first network device on at least one first carrier; the processing unit is further configured to determine signal strength of the downlink reference signal; and the transceiver unit is configured to: when the signal strength of the downlink reference signal is greater than or equal to a first specified value, send uplink information to the first network device on a grant-free resource corresponding to an active carrier.

With reference to the ninth aspect, in still another possible implementation, the communication apparatus includes an input interface, an output interface, and a processing circuit. The processing circuit is configured to detect a downlink reference signal from a first network device on at least one first carrier; the processing circuit is further configured to determine signal strength of the downlink reference signal; and the output interface is configured to: when the signal strength of the downlink reference signal is greater than or equal to a first specified value, send uplink information to the first network device on a grant-free resource corresponding to an active carrier.

For example, the communication apparatus further includes a memory. The memory is coupled to at least one processor, and the at least one processor is configured to run program instructions stored in the memory, so that the communication apparatus performs the method according to any one of the third aspect or the possible implementations of the third aspect.

In a possible implementation, the memory is configured to store program instructions and data. The memory is coupled to the at least one processor, and the at least one processor may invoke and execute the program instructions stored in the memory, so that the communication apparatus performs the method according to any one of the third aspect or the possible implementations of the third aspect.

For example, the communication apparatus further includes a communication interface. The communication interface is used by the communication apparatus to communicate with another device. When the communication apparatus is a terminal, the communication interface is a transceiver, an input/output interface, a circuit, or the like.

In a possible design, the communication apparatus includes at least one processor and a communication interface, configured to perform the method according to any one of the third aspect or the possible implementations of the third aspect. The at least one processor communicates with outside through the communication interface. The at least one processor is configured to run a computer program, so that the communication apparatus performs the method according to any one of the third aspect or the possible implementations of the third aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the ninth aspect, refer to technical effects brought by different design manners in the third aspect. Details are not described herein again.

According to a tenth aspect, a communication apparatus is provided, configured to perform the method according to any one of the fourth aspect or the possible implementations of the fourth aspect. The communication apparatus may be the first network device according to any one of the fourth aspect or the possible implementations of the fourth aspect, or a module applied to a first network device, for example, a chip or a chip system. The communication apparatus includes a corresponding module, unit (e.g., circuit), or means for performing the foregoing methods. The module, unit, or means may be implemented by using hardware or software, or may be implemented by using hardware executing corresponding software. The hardware or the software includes at least one module or unit corresponding to the foregoing functions.

With reference to the tenth aspect, in a possible implementation, the communication apparatus includes a transceiver unit and a processing unit. The transceiver unit is configured to send a downlink reference signal on at least one first carrier; and the processing unit is configured to detect uplink information from a terminal device on a grant-free resource corresponding to an active carrier.

With reference to the tenth aspect, in still another possible implementation, the communication apparatus includes an input interface, an output interface, and a processing circuit. The output interface is configured to send a downlink reference signal on at least one first carrier; and the processing circuit is configured to detect uplink information from a terminal device on a grant-free resource corresponding to an active carrier.

For example, the communication apparatus further includes a memory. The memory is coupled to at least one processor, and the at least one processor is configured to run program instructions stored in the memory, so that the communication apparatus performs the method according to any one of the fourth aspect or the possible implementations of the fourth aspect.

In a possible implementation, the memory is configured to store program instructions and data. The memory is coupled to the at least one processor, and the at least one processor may invoke and execute the program instructions stored in the memory, so that the communication apparatus performs the method according to any one of the fourth aspect or the possible implementations of the fourth aspect.

For example, the communication apparatus further includes a communication interface. The communication interface is used by the communication apparatus to communicate with another device. When the communication apparatus is an access network device, the communication interface is a transceiver, an input/output interface, a circuit, or the like.

In a possible design, the communication apparatus includes at least one processor and a communication interface, configured to perform the method according to any one of the fourth aspect or the possible implementations of the fourth aspect. The at least one processor communicates with outside through the communication interface. The at least one processor is configured to run a computer program, so that the communication apparatus performs the method according to any one of the fourth aspect or the possible implementations of the fourth aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the tenth aspect, refer to technical effects brought by different design manners in the fourth aspect. Details are not described herein again.

According to an eleventh aspect, a communication apparatus is provided, configured to perform the method according to any one of the fifth aspect or the possible implementations of the fifth aspect. The communication apparatus may be the terminal device according to any one of the fifth aspect or the possible implementations of the fifth aspect, or may be a module applied to a terminal device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes at least one module or unit corresponding to the foregoing functions.

With reference to the eleventh aspect, in a possible implementation, the communication apparatus includes a processing unit and a transceiver unit. The processing unit is configured to detect a downlink reference signal from a first network device on at least one first carrier; the processing unit is further configured to determine signal strength of the downlink reference signal; and the transceiver unit is configured to: when the signal strength of the downlink reference signal is greater than a second specified value, send a first uplink signal to the first network device on the at least one first carrier.

Optionally, the transceiver unit is further configured to receive first feedback information. The first feedback information includes information about an active carrier in the at least one first carrier.

Optionally, the processing unit is further configured to determine an initial uplink timing advance based on the downlink reference signal.

Optionally, the transceiver unit is further configured to receive first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the transceiver unit is further configured to receive second downlink control information, where the second downlink control information is used for triggering transmission of the first uplink signal, and the second downlink control information includes the trigger indication information.

With reference to the eleventh aspect, in still another possible implementation, the communication apparatus includes an input interface, an output interface, and a processing circuit. The processing circuit is configured to detect a downlink reference signal from a first network device on at least one first carrier; the processing circuit is further configured to determine signal strength of the downlink reference signal; and the output interface is configured to: when the signal strength of the downlink reference signal is greater than a second specified value, send a first uplink signal to the first network device on the at least one first carrier.

Optionally, the input interface is further configured to receive first feedback information. The first feedback information includes information about an active carrier in the at least one first carrier.

Optionally, the processing circuit is further configured to determine an initial uplink timing advance based on the downlink reference signal.

Optionally, the input interface is further configured to receive first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the input interface is further configured to receive second downlink control information, where the second downlink control information is used for triggering transmission of the first uplink signal, and the second downlink control information includes the trigger indication information.

For example, the communication apparatus further includes a memory. The memory is coupled to at least one processor, and the at least one processor is configured to run program instructions stored in the memory, so that the communication apparatus performs the method according to any one of the fifth aspect or the possible implementations of the fifth aspect.

In a possible implementation, the memory is configured to store program instructions and data. The memory is coupled to the at least one processor, and the at least one processor may invoke and execute the program instructions stored in the memory, so that the communication apparatus performs the method according to any one of the fifth aspect or the possible implementations of the fifth aspect.

For example, the communication apparatus further includes a communication interface. The communication interface is used by the communication apparatus to communicate with another device. When the communication apparatus is a terminal, the communication interface is a transceiver, an input/output interface, a circuit, or the like.

In a possible design, the communication apparatus includes at least one processor and a communication interface, configured to perform the method according to any one of the fifth aspect or the possible implementations of the fifth aspect. The at least one processor communicates with outside through the communication interface. The at least one processor is configured to run a computer program, so that the communication apparatus performs the method according to any one of the fifth aspect or the possible implementations of the fifth aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the eleventh aspect, refer to technical effects brought by different design manners in the fifth aspect. Details are not described herein again.

According to a twelfth aspect, a communication apparatus is provided, configured to perform the method according to any one of the sixth aspect or the possible implementations of the sixth aspect. The communication apparatus may be the first network device according to any one of the sixth aspect or the possible implementations of the sixth aspect, or a module applied to a first network device, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes at least one module or unit corresponding to the foregoing functions.

With reference to the twelfth aspect, in a possible implementation, the communication apparatus includes a transceiver unit and a processing unit. The transceiver unit is configured to send a downlink reference signal on at least one first carrier; and the processing unit is configured to detect a first uplink signal sent by the terminal device on the at least one first carrier.

Optionally, the processing unit is further configured to determine signal strength of the first uplink signal on the at least one first carrier; the processing unit is further configured to determine an active carrier based on the signal strength of the first uplink signal on the at least one first carrier; and the transceiver unit is further configured to send first feedback information. The first feedback information includes information about the active carrier in the at least one first carrier.

Optionally, the transceiver unit is configured to send first indication information to a second network device, where the first indication information includes the information about the active carrier in the at least one first carrier; or the transceiver unit is further configured to send the first feedback information to the terminal device.

Optionally, the transceiver unit is configured to send first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the transceiver unit is configured to send second downlink control information, where the second downlink control information is used for triggering transmission of the first uplink signal, and the second downlink control information includes the trigger indication information.

With reference to the twelfth aspect, in still another possible implementation, the communication apparatus includes an input interface, an output interface, and a processing circuit. The output interface is configured to send a downlink reference signal on at least one first carrier; and the processing circuit is configured to detect a first uplink signal sent by the terminal device on the at least one first carrier.

Optionally, the processing circuit is further configured to determine signal strength of the first uplink signal on the at least one first carrier; the processing circuit is further configured to determine an active carrier based on the signal strength of the first uplink signal on the at least one first carrier; and the output interface is further configured to send first feedback information. The first feedback information includes information about the active carrier in the at least one first carrier.

Optionally, the output interface is configured to send first indication information to a second network device, where the first indication information includes the information about the active carrier in the at least one first carrier; or the output interface is further configured to send the first feedback information to the terminal device.

Optionally, the output interface is configured to send first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the output interface is configured to send second downlink control information, where the second downlink control information is used for triggering transmission of the first uplink signal, and the second downlink control information includes the trigger indication information.

For example, the communication apparatus further includes a memory. The memory is coupled to at least one processor, and the at least one processor is configured to run program instructions stored in the memory, so that the communication apparatus performs the method according to any one of the sixth aspect or the possible implementations of the sixth aspect.

In a possible implementation, the memory is configured to store program instructions and data. The memory is coupled to the at least one processor, and the at least one processor may invoke and execute the program instructions stored in the memory, so that the communication apparatus performs the method according to any one of the sixth aspect or the possible implementations of the sixth aspect.

For example, the communication apparatus further includes a communication interface. The communication interface is used by the communication apparatus to communicate with another device. When the communication apparatus is an access network device, the communication interface is a transceiver, an input/output interface, a circuit, or the like.

In a possible design, the communication apparatus includes at least one processor and a communication interface, configured to perform the method according to any one of the sixth aspect or the possible implementations of the sixth aspect. The at least one processor communicates with outside through the communication interface. The at least one processor is configured to run a computer program, so that the communication apparatus performs the method according to any one of the sixth aspect or the possible implementations of the sixth aspect. It may be understood that the outside may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design manner in the twelfth aspect, refer to technical effects brought by different design manners in the sixth aspect. Details are not described herein again.

According to a thirteenth aspect, a communication system is provided, including the communication apparatus according to any one of the seventh aspect or the implementations of the seventh aspect, and the communication apparatus according to any one of the eighth aspect or the implementations of the eighth aspect.

According to a fourteenth aspect, a communication system is provided, including the communication apparatus according to any one of the ninth aspect or the implementations of the ninth aspect, and the communication apparatus according to any one of the tenth aspect or the implementations of the tenth aspect.

According to a fifteenth aspect, a communication system is provided, including the communication apparatus according to any one of the eleventh aspect or the implementations of the eleventh aspect, and the communication apparatus according to any one of the twelfth aspect or the implementations of the twelfth aspect.

According to a sixteenth aspect, a computer-readable storage medium is provided, and stores a computer program. When the computer program is run on a computer, the method according to any one of the foregoing aspects or the implementations of the foregoing aspects is performed.

According to a seventeenth aspect, a computer program product is provided. When the computer program product is run on a computer, the method according to any one of the foregoing aspects or the implementations of the foregoing aspects is performed.

According to an eighteenth aspect, a computer program is provided. When the computer program is run on a computer, the method according to any one of the foregoing aspects or the implementations of the foregoing aspects is performed.

BRIEF DESCRIPTION OF DRAWINGS

FIG. 5 is another schematic flowchart of a communication method according to an embodiment of this application;

FIG. 6 is still another schematic flowchart of a communication method according to an embodiment of this application;

DESCRIPTION OF EMBODIMENTS

The following describes embodiments of this application with reference to the accompanying drawings in embodiments of this application.

Figures 1, 2:
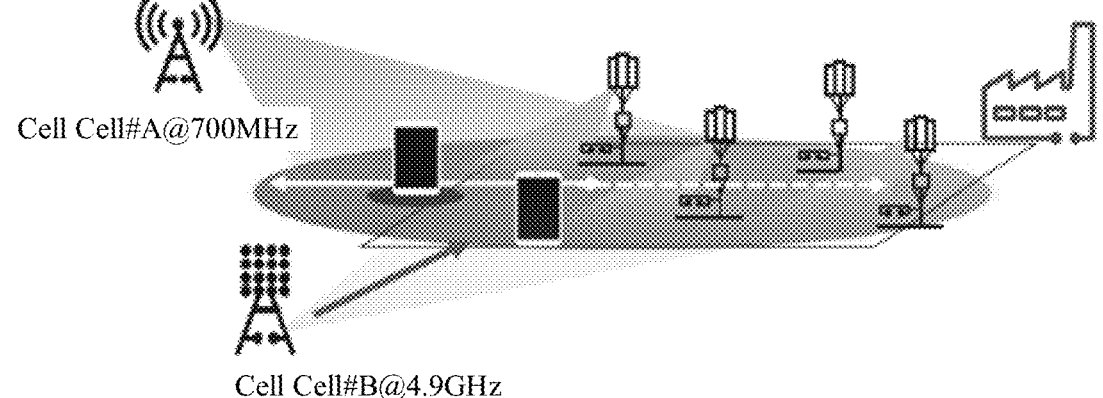
FIG. 1 is a schematic diagram of a structure of a network according to an embodiment of this application.
FIG. 2 is a schematic diagram of a communication system according to an embodiment of this application.

FIG. 1 is a schematic diagram of a structure of a network according to an embodiment of this application. In some embodiments, a terminal device may be located within a coverage area of both a macro base station (for example, a cell #A in FIG. 1) and a micro base station (for example, a cell #B in FIG. 1), and the terminal device may establish a communication connection to the macro base station and the micro base station. The cell #A occupies a low frequency band, for example, a 700 MHz frequency band, an 800 MHz frequency band, a 2 GHz frequency band, a 1.9 GHz frequency band, a 2.1 GHz frequency band, or a 2.5 GHz frequency band. The cell #B occupies a high frequency band, for example, a 3.5 GHz frequency band or a 4.9 GHz frequency band. A high frequency band may be understood as any frequency band higher than 3.5 GHz, and the any frequency band herein also includes a millimeter-wave frequency band. For example, a high frequency band of 4.9 GHz may include at least one carrier, and these carriers may be uplink-only carriers or uplink-dominant (UL dominant) carriers.

The technical solutions in embodiments of this application may be applied to various communication systems, for example, a long term evolution (LTE) system, an LTE frequency division duplex (FDD) system, an LTE time division duplex (TDD) system, a 5th generation (5G) system, or a new radio (NR) system. A 5G mobile communication system in embodiments of this application includes a non-standalone (NSA) 5G mobile communication system or a standalone (SA) 5G mobile communication system. The technical solutions provided in embodiments of this application may be further applied to a future communication system, for example, a 6th generation (6G) mobile communication system. The communication system in embodiments of this application may alternatively be a public land mobile communication network (PLMN), a device-to-device (D2D) communication system, a machine-to-machine (M2M) communication system, an internet of things (IoT) communication system, an internet of vehicles communication system, or another communication system.

FIG. 2 is a schematic diagram of a communication system according to an embodiment of this application. The communication system may include a first network device 201, a second network device 202, and a terminal device 203 connected to the first network device 201 and the second network device 202. The first network device 201 may be the micro base station shown in FIG. 1, and occupies a high frequency band, for example, a 4.9 GHz frequency band. The second network device 202 may be the macro base station shown in FIG. 1, and occupies a low frequency band, for example, a 2.5 GHz frequency band.

The terminal device 203 in embodiments of this application may be an access terminal, a subscriber unit, a subscriber station, a mobile station, a mobile console, a relay station, a remote station, a remote terminal, a mobile device, a user terminal, user equipment (UE), a terminal, a wireless communication device, a user agent, a user apparatus, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, a terminal in a future evolved PLMN, a terminal in a future internet of vehicles, or the like. This is not limited in embodiments of this application.

By way of example, and not limitation, in embodiments of this application, the terminal device 203 may be a mobile phone, a tablet computer, a computer with a wireless transceiver function, a virtual reality (VR) terminal, an augmented reality (AR) terminal, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like.

By way of example, and not limitation, in embodiments of this application, the wearable device may alternatively be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, and smart jewelry for monitoring physical signs.

In addition, the terminal device 203 in embodiments of this application may alternatively be a terminal in an IoT system. IoT is an important part of future information technology development. A main technical feature of the IoT is to connect an object to a network by using a communication technology, to implement an intelligent network for human-machine interconnection and thing-thing interconnection. In embodiments of this application, an IoT technology may implement massive connections, deep coverage, and terminal power saving by using, for example, a narrow band (NB) technology.

In addition, in embodiments of this application, the terminal device 203 may alternatively include a sensor such as an intelligent printer, a train detector, or a gas station. Main functions of the terminal device 203 include collecting data (for some terminals), receiving control information and downlink data from an access network device, sending an electromagnetic wave, and transmitting uplink data to the access network device.

Optionally, the first network device 201/the second network device 202 in embodiments of this application may be any communication device that has a wireless transceiver function and that is configured to communicate with the terminal device 203. The first network device 201/the second network device 202 includes but is not limited to: an evolved node B (eNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the first network device 201/the second network device 202 may alternatively be a gNB, a TRP, or a TP in a 5G system, or one antenna panel or a group of antenna panels (including a plurality of antenna panels) of a base station in a 5G system. In addition, the first network device 201/the second network device 202 may alternatively be a network node that forms a gNB or a TP, for example, a BBU or a distributed unit (DU). The first network device 201/the second network device 202 may alternatively be a network device in a 5.5G or 6G system.

In some deployments, a gNB may include a centralized unit (CU) and a DU. In addition, the gNB may alternatively include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a medium access control (MAC) layer, and a physical layer (PHY). The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the access network device may be a device including one or more of a CU node, a DU node, and an AAU node.

Optionally, in embodiments of this application, the first network device 201/the second network device 202 and the terminal device 203 may communicate with each other by using a licensed spectrum, or may communicate with each other by using an unlicensed spectrum, or may communicate with each other by using both a licensed spectrum and an unlicensed spectrum. The first network device 201 and the terminal device 203 may communicate with each other by using a high spectrum (for example, 4.9 GHz), and the second network device 202 and the terminal device 203 may communicate with each other by using a low spectrum (for example, 2.5 GHz).

Optionally, the first network device 201, the second network device 202, and the terminal device 203 in embodiments of this application may be deployed on land, including an indoor or outdoor device, a handheld device, or a vehicle-mounted device; or may be deployed on a water surface; or may be deployed on an aircraft, a balloon, or an artificial satellite in the air. Application scenarios of the first network device 201, the second network device 202, and the terminal device 203 are not limited in an embodiment of embodiments of this application.

Optionally, in embodiments of this application, the first network device 201, the second network device 202, and the terminal device 203 include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a UNIX operating system, an Android operating system, an iOS operating system, or a Windows operating system. The application layer includes applications such as a browser, an address book, word processing software, and instant messaging software. In addition, a specific structure of an execution body of a method provided in embodiments of this application is not limited in embodiments of this application, provided that a program that records code of the method provided in embodiments of this application can be run to perform communication according to the method provided in embodiments of this application. For example, the execution body of the method provided in embodiments of this application may be the first network device 201, the second network device 202, and the terminal device 203, or a functional module that can invoke and execute a program in the first network device 201, the second network device 202, and the terminal device 203.

In other words, related functions of the first network device 201, the second network device 202, and the terminal device 203 in embodiments of this application may be implemented by one device, or may be jointly implemented by a plurality of devices, or may be implemented by at least one functional module in one device. This is not limited in embodiments of this application. It may be understood that the foregoing function may be a network element in a hardware device, or a software function running on special-purpose hardware, or a combination of hardware and software, or a virtualization function instantiated on a platform (for example, a cloud platform).

Figure 3:
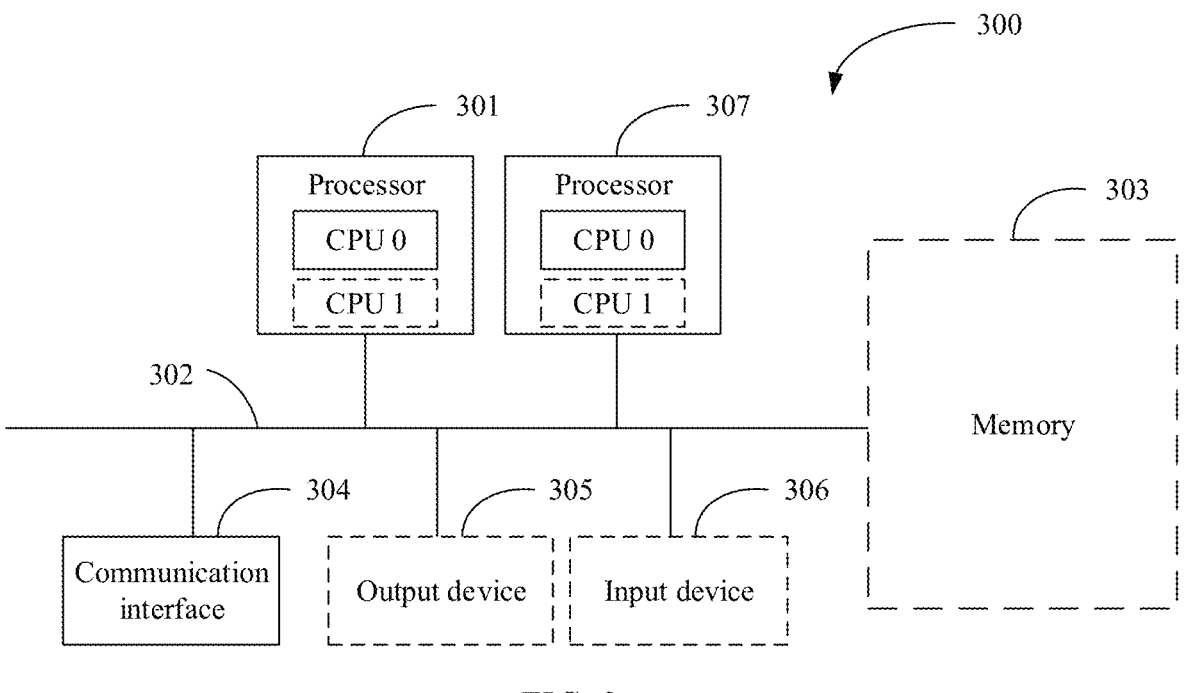
FIG. 3 is a schematic diagram of a structure of a communication apparatus 300 according to an embodiment of this application.

For example, related functions of the first network device 201, the second network device 202, and the terminal device 203 in embodiments of this application may be implemented by a communication apparatus 300 in FIG. 3. FIG. 3 is a schematic diagram of a structure of a communication apparatus 300 according to an embodiment of this application. The communication apparatus 300 includes at least one processor 301, a communication line 302, and at least one communication interface (in FIG. 3, only an example in which a communication interface 304 and one processor 301 are included is used for description). Optionally, the communication apparatus 300 may further include a memory 303.

The processor 301 may be a central processing unit (CPU), a microprocessor, an application-specific integrated circuit (ASIC), or at least one integrated circuit configured to control program execution of the solution in embodiments of this application.

The communication line 302 may include a path used to connect different components.

The communication interface 304 may be a transceiver module, configured to communicate with another device or a communication network, for example, the Ethernet, a RAN, or a wireless local area network (WLAN). For example, the transceiver module may be an apparatus such as a transceiver or a transceiver machine. Optionally, the communication interface 304 may alternatively be a transceiver circuit located inside the processor 301, and is configured to implement signal input and signal output of the processor.

The memory 303 may be an apparatus having a storage function. For example, the memory 303 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communication line 302. The memory may alternatively be integrated with the processor.

The memory 303 is configured to store computer-executable instructions for executing the solutions in embodiments of this application, and the processor 301 controls the execution. The processor 301 is configured to execute the computer-executable instructions stored in the memory 303, to implement communication methods provided in embodiments of this application.

Alternatively, the processor 301 may perform a processing-related function in the communication method provided in embodiments of this application, and the communication interface 304 is responsible for communicating with another device or a communication network. This is not limited in embodiments of this application.

The computer-executable instructions in embodiments of this application may alternatively be referred to as application program code. This is not limited in embodiments of this application.

During some implementations, in an embodiment, the processor 301 may include at least one CPU, for example, a CPU 0 and a CPU 1 in FIG. 3.

In some implementations, in an embodiment, the communication apparatus 300 may include a plurality of processors, for example, the processor 301 and a processor 303 in FIG. 3. Each of the processors may be a single-core (single-CPU) processor, or may be a multi-core (multi-CPU) processor. The processor herein may be at least one device, circuit, and/or a processing core configured to process data (such as computer program instructions).

During some implementations, in an embodiment, the communication apparatus 300 may further include an output device 305 and an input device 303. The output device 305 communicates with the processor 301, and may display information in a plurality of manners.

The communication apparatus 300 may be a general-purpose apparatus or a dedicated apparatus. For example, the communication apparatus 300 may be a desktop computer, a portable computer, a network server, a palmtop computer (such as personal digital assistant (PDA)), a mobile phone, a tablet computer, a wireless terminal, an embedded device, or a device having a structure similar to that in FIG. 3. A type of the communication apparatus 300 is not limited in embodiments of this application.

The following describes the communication method provided in embodiments of this application in detail with reference to FIG. 1 to FIG. 10.

It should be noted that in embodiments of this application, names of messages between network elements, names of parameters in messages, or the like are merely examples, and there may be other names in some implementations. This is not limited in embodiments of this application.

In embodiments of this application, these names may be used separately, or may be used together.

In some embodiments, a high frequency band/a low frequency band is used as an example below. The high frequency band may be replaced with a second frequency band. The low frequency band may be replaced with a first frequency band. The first frequency band may be a licensed frequency band; the second frequency band may be an unlicensed frequency band; or the first frequency band may be a low spectrum; and the second frequency band may be a high spectrum.

In this application, a carrier may alternatively be replaced with a "beam". Correspondingly, a first carrier may be a first beam, and an $X^{th}$ carrier may be an $X^{th}$ beam. Similarly, an active carrier may be an active beam, and a carrier identifier may be a beam identifier. Optionally, the beam identifier may be second identification information.

Uplink measurement is used to determine whether a carrier is active, or whether a carrier is selected for data transmission. Alternatively, the uplink measurement may be used to determine whether a beam is active or whether a beam is selected for data transmission. This is applicable to a case in which the second frequency band is a high frequency, for example, a second spectrum is a millimeter wave.

In in some embodiments, when configuring a resource of an uplink measurement signal for the first network device/terminal device, the second network device may simultaneously indicate that the resource is used for random access, or may indicate that the resource is simultaneously used for random access; or when configuring a resource for random access for the first network device/terminal device, the second network device may simultaneously indicate that the resource is used for uplink measurement, or may indicate that the resource is simultaneously used for uplink measurement.

In some embodiments, optionally, when configuring a resource of the uplink measurement signal for the first network device/terminal device, the second network device indicates that resource is used for both obtaining timing advance (TA) and uplink measurement. In this way, the first network device/terminal device can perform identification. Herein, the timing advance may alternatively be referred to as a time advance amount, a time advance value, or a timing advance amount. Optionally, when the terminal device periodically sends or is triggered to send the uplink measurement signal, the first network device can correspondingly perform receiving. Certainly, the resource of the uplink measurement signal may alternatively be determined by the first network device and exchanged to the second network device.

In an embodiment, when configuring a resource identifier of the uplink measurement signal for the first network device/terminal device, the second network device indicates that the resource is used for both obtaining TA and uplink measurement. In another embodiment, when the second network device configures a resource of the uplink measurement signal for the first network device/terminal device, indication information is added, to identify that the resource of the uplink measurement signal is used for both obtaining TA and for uplink measurement; or indication information is added, to identify whether the resource of the uplink measurement signal is used for both obtaining TA and for uplink measurement. Optionally, the indication information is one bit.

In some embodiments, the resource of the uplink measurement signal may be separately configured for different carrier identifiers related to the second frequency band, or may indicate TDD transmission patterns on different carriers for a same configuration. Symbol position of the uplink measurement signal may be consecutive symbols in a slot, or may be non-consecutive symbols. Any OFDM position in a slot may be occupied.

In some other embodiments, when configuring a resource for random access for the first network device/terminal device, the second network device may indicate that the resource is used for uplink measurement.

In some embodiments, optionally, when configuring a resource of the uplink measurement signal for the first network device/terminal device, the second network device indicates that the resource is used for uplink measurement. In this way, the first network device/terminal device can perform identification. Optionally, when the terminal device periodically sends or is triggered to send the uplink measurement signal, the first network device can correspondingly perform receiving. Certainly, the resource of the uplink measurement signal may be determined by the second network device, or may be determined by the first network device and exchanged to the second network device.

In an embodiment, when configuring a resource identifier of the uplink measurement signal for the first network device/terminal device, the second network device indicates that the resource is used for uplink measurement. In another embodiment, when the second network device configures a resource of the uplink measurement signal for the first network device/terminal device, indication information is added, to identify that the resource of the uplink measurement signal is used for uplink measurement; or indication information is added, to identify whether the resource of the uplink measurement signal is used for uplink measurement. Optionally, the indication information is one bit.

In some embodiments, the resource of the uplink measurement signal may be separately configured for different carrier identifiers related to the second frequency band, or may indicate TDD transmission patterns on different carriers for a same configuration. Symbol position of the uplink measurement signal may be consecutive symbols in a slot, or may be non-consecutive symbols. Any OFDM position in a slot may be occupied.

In some embodiments, first feedback information may alternatively be referred to as first response information or first information. It is only used as a name and does not constitute a limitation.

In some embodiments, system information is a remaining system information block (remaining SIB (RMSB)), or the system information is an on demand based system information block (on demand based SIB).

Figure 4:
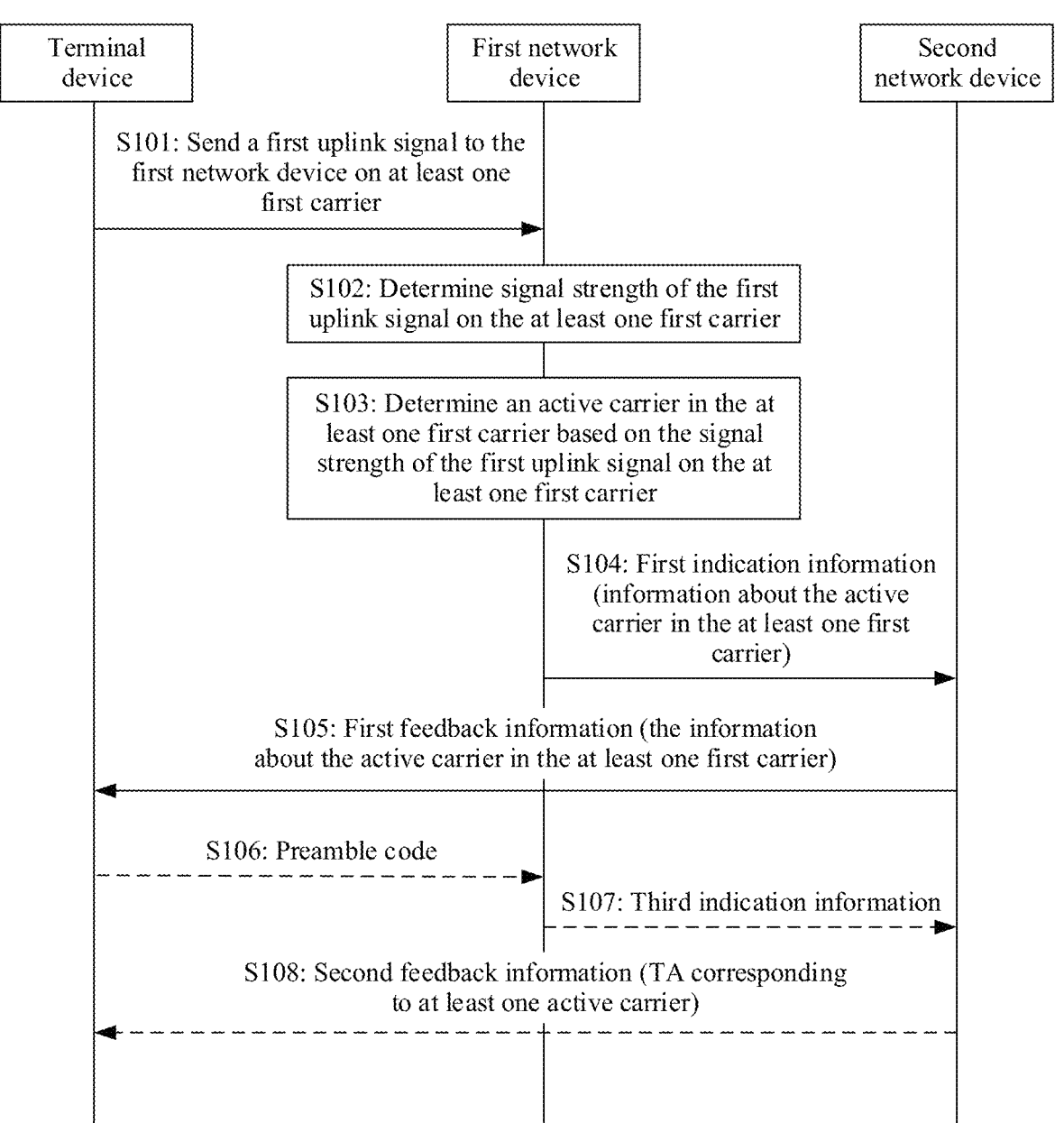
FIG. 4 is a schematic flowchart of a communication method according to an embodiment of this application.

FIG. 4 is a schematic flowchart of a communication method according to an embodiment of this application. For example, the method may include:

S101: A terminal device sends a first uplink signal to a first network device on at least one first carrier.

Correspondingly, the first network device receives the first uplink signal on the at least one first carrier. Receiving in embodiments of this application may alternatively be understood as detecting, sounding, measuring, or monitoring. For example, receiving the first uplink signal may be understood as detecting or measuring the first uplink signal.

As described above, when SUL is implemented by using a high frequency band, reliability of communication cannot be determined, and a new access mechanism needs to be designed. In addition, for example, a high frequency band of the 4.9 GHz frequency band includes at least one carrier, and these carriers are usually uplink-only carriers or uplink-dominant carriers. This needs to be considered when a new access mechanism is designed.

In some embodiments, the uplink-only carrier is a carrier whose all slots are uplink slots in an uplink-downlink slot configuration. An uplink-dominant carrier is a carrier with a large quantity of uplink slots and a small quantity of downlink slots in an uplink-downlink slot configuration. For example, an uplink-downlink slot configuration of an uplink-dominant carrier is as follows: Every X slots are considered as a slot configuration period, there are Y downlink slots in the period, and all remaining X-Y slots are uplink slots. X may be a positive integer greater than Y, for example, 20, 30, 40, or 60. Correspondingly, Y is a positive integer smaller than X, for example, 1, 2, or 3. For example, in an uplink-dominant carrier, uplink and downlink slots may be configured as one downlink slot and X−1 uplink slots that are sequentially cyclic, or may be configured as X−1 uplink slots and one downlink slot that are sequentially cyclic. If one slot includes a downlink symbol, the slot may be referred to as a downlink slot. To be specific, the downlink slot may be understood as a slot including a downlink symbol. Downlink symbols may be consecutive or non-consecutive. Optionally, a band width or a band width partial (BWP) or a physical resource block (PRB) on which the downlink symbol is located is configurable.

In this application, any "configurable" or "configure" may be understood as being configured by the first network device or a second network device by using RRC signaling, or may be understood as being configured by the first network device or the second network device by using MAC layer signaling or physical layer signaling. For example, the first network device or the second network device may configure, by using RRC signaling, a quantity of downlink symbols included in the downlink slot.

Therefore, in some embodiments, the terminal device sends the first uplink signal to the first network device on the at least one carrier of the high frequency band. The first network device may be the micro base station shown in FIG. 1, and the micro base station is located in the foregoing high frequency band. The first uplink signal is used for uplink measurement. The first uplink signal may be a sounding reference signal (SRS), a preamble code, a demodulation reference signal (DMRS), a channel state information-reference signal (CSI-RS), or any defined sequence. Optionally, in some embodiments, any defined sequence may be a ZC sequence or a C sequence. For example, the first uplink signal is an SRS. The SRS is not used for scheduling, but is used for uplink measurement. In this case, the SRS may alternatively be referred to as an access SRS or a radio resource management-sounding reference signal (RRM-SRS).

In some embodiments, scheduling is currently used for uplink channel measurement or obtaining channel state. Uplink measurement is used to determine whether a carrier is active, or whether a carrier is selected for data transmission. Uplink measurement may also be understood as uplink detection. The preamble code may also be referred to as a preamble sequence or a preamble signal.

The terminal device sending the first uplink signal to the first network device on the at least one carrier may be that the terminal device sends the first uplink signal to the first network device on each carrier within a specified time. The first network device receives, on each carrier, the first uplink signal sent by the terminal device.

In some embodiments, specifying may be understood as presetting. Presetting is predefined or preconfigured. The pre-configuration is configured by the first network device/second network device by using RRC signaling or MAC signaling.

In some embodiments, any of the foregoing is configured by the second network device, and configuration information of the terminal device can be indicated when there is only the uplink slot between the first network device and the terminal device. Any of the foregoing is configured by the first network device, and configuration information of the terminal device can be indicated when there is the downlink slot or downlink symbol transmission between the first network device and the terminal device.

The at least one carrier that meets a specified condition may belong to one carrier group. For example, the specified condition may be that carrier positions are adjacent, or the carriers have common attribute information. In some embodiments, the carrier group may alternatively be referred to as a carrier set.

S102: The first network device determines signal strength of the first uplink signal on the at least one first carrier.

The first network device determining the signal strength of the first uplink signal on the at least one first carrier may be: the first network device measures the first uplink signal received on the at least one first carrier, to obtain the signal strength of the first uplink signal on the at least one first carrier; or the first network device obtains the signal strength of the first uplink signal on the at least one first carrier based on the first uplink signal received on the at least one first carrier. "Obtaining" or "acquiring" may be understood as direct determining, or may be understood as derivation.

In some embodiments, the signal strength of the first uplink signal may be signal strength of a layer 1 or signal strength obtained by filtering at a layer 3.

After receiving the first uplink signal on a plurality of carriers, the first network device separately measures the first uplink signal received on a corresponding carrier, to obtain signal strength of the first uplink signal on the carrier. The signal strength of the first uplink signal may be measured by using an existing technology. The signal strength may be represented as one or more of reference signal received power (RSRP), reference signal received quality (RSRQ), a reference signal strength indicator (RSSI), and the like.

Optionally, after receiving the first uplink signal on each carrier, the first network device separately measures the first uplink signal received on each carrier, to obtain signal strength of the first uplink signal on each carrier. The signal strength of the first uplink signal may be measured by using an existing technology. The signal strength may be represented as one or more of RSRPs, RSRQ, a RSSI, and the like.

S103: The first network device determines an active carrier in the at least one first carrier based on the signal strength of the first uplink signal on the at least one first carrier.

The first network device may determine, based on the signal strength that is of the first uplink signal on the at least one carrier and that is obtained through measurement, whether the signal strength of the first uplink signal on the corresponding carrier is greater than or equal to a specified value. If signal strength of a first uplink signal on a first carrier is greater than or equal to the specified value, the first carrier is determined as an active carrier. The active carrier may alternatively be referred to as a serving carrier or an operating carrier, and means that the carrier may be active for access or uplink information transmission of the terminal device. The active carrier may alternatively be referred to as a second carrier. The active carrier is at least one carrier whose signal strength is greater than or equal to the specified value and that is in the at least one first carrier. In some embodiments, the active carrier is merely used as an example, and is not used as a name limitation. In some embodiments, access may be understood as access used for uplink capacity expansion, or access used for super uplink. In some embodiments, the serving carrier is a carrier that can serve the terminal device, and the operating carrier is a carrier on which the terminal device can transmit data. Data transmission is uplink data transmission, or is mainly uplink data transmission.

Optionally, the first network device compares, based on the measured signal strength of the first uplink signal on each carrier, whether the signal strength of the first uplink signal on each carrier is greater than or equal to the specified value. If the signal strength of the first uplink signal on the first carrier is greater than or equal to the specified value, the first carrier may be determined as an active carrier.

Optionally, when the at least one first carrier is uplink-only, the following steps S104 and S105 may be performed.

S104: The first network device sends first indication information to the second network device, where the first indication information includes information about the active carrier in the at least one first carrier.

Correspondingly, the second network device receives the first indication information.

The first indication information may further include second identification information corresponding to the terminal device.

In some embodiments, the second identification information includes at least one of the following: a sequence identifier corresponding to an uplink signal and a resource identifier corresponding to the uplink signal. The sequence identifier is an SRS sequence, a preamble sequence, or any newly defined sequence (for example, a ZC sequence or an m sequence) used for identifying the UE. The resource identifier corresponding to the uplink signal is a resource index of the uplink signal or a resource index of a set in which the uplink signal is located.

The information about the active carrier in the first carrier may be information about an active beam in a first beam. Optionally, the information about the active beam is second identification information.

When the at least one first carrier is uplink-only, the first network device sends the first indication information to the second network device after determining the active carrier. The first indication information includes the information about the active carrier in the at least one first carrier. The second network device may be the macro base station shown in FIG. 1. There is a downlink slot between the second network device and the terminal device, and the second network device may send downlink information to the terminal device. Therefore, the second network device may send the first feedback information to the terminal device based on the first indication information.

S105: The second network device sends the first feedback information to the terminal device.

Correspondingly, the terminal device receives the first feedback information.

The first feedback information includes the information about the active carrier in the at least one first carrier. The information about the active carrier may be understood as information indicating the active carrier in the at least one first carrier. The indication herein may be a direct indication, or may be an implicit indication, so that the terminal device can learn that any information about the active carrier in the at least one first carrier may be understood as the information about the active carrier.

When the at least one first carrier is uplink-only, the second network device sends the first feedback information to the terminal device after receiving the first indication information sent by the first network device. After receiving the first feedback information, the terminal device may learn of the information about the active carrier that can be used for access or uplink data transmission.

In some embodiments, the first indication information is information transmitted on an interface between network devices, and the first feedback information is information sent by the network device to the terminal device. The first feedback information is determined based on the first indication information. The first indication information and the first feedback information may be same information, or may be different information. Content included in the first indication information and the first feedback information may be completely the same or partially the same. When the first indication information is completely the same as the first feedback information, the second network device sending the first feedback information may be understood as forwarding the first indication information.

Optionally, after the terminal device receives the first feedback information, the following step S106 (represented by a dashed line in the figure) may be performed.

S106: The terminal device sends a preamble code to the first network device on at least one active carrier.

Optionally, when the at least one first carrier is uplink-only, the following steps S107 and S108 (represented by dashed lines in the figure) may be performed.

S107: The first network device sends third indication information to the second network device, where the third indication information includes a TA corresponding to the at least one active carrier.

S108: The second network device sends second feedback information to the terminal device.

Correspondingly, the terminal device receives the second feedback information corresponding to the at least one active carrier.

The second feedback information includes the TA corresponding to the at least one active carrier. Optionally, the second feedback information may be a random access response (RAR) message.

According to the communication method provided in some embodiments, the signal strength of the first uplink signal sent by the terminal device on the at least one first carrier is determined, to accurately determine the information about the active carrier in the at least one first carrier. This improves reliability of communication on the active carrier. In addition, after the active carrier is determined, a TA value corresponding to the active carrier may be obtained through random access.

In still another embodiment, the at least one first carrier may not be uplink-only. FIG. 5 is still another schematic flowchart of a communication method according to an embodiment of this application. For example, the method may include the following steps.

S101': A terminal device sends a first uplink signal to a first network device on at least one first carrier.

For some implementations of this step, refer to step S101 in the embodiment shown in FIG. 4.

S102': The first network device determines signal strength of the first uplink signal on the at least one first carrier.

For some implementations of this step, refer to step S102 in the embodiment shown in FIG. 4.

S103': The first network device determines an active carrier in the at least one first carrier based on the signal strength of the first uplink signal on the at least one first carrier.

For some implementations of this step, refer to step S103 in the embodiment shown in FIG. 4.

S104': The first network device sends first feedback information to the terminal device.

Correspondingly, the terminal device receives the first feedback information.

The first feedback information includes information about the active carrier in the at least one first carrier.

Different than the embodiment shown in FIG. 4, in some embodiments, when the at least one first carrier is uplink-dominant, that is, the at least one first carrier includes a few downlink slots, the first network device may send the first feedback information to the terminal device on a first slot. The first slot is a downlink slot configured by the first network device for the terminal device.

Optionally, after the terminal device receives the first feedback information, the following step S105' (represented by a dashed line in the figure) may be performed.

S105': The terminal device sends a preamble code to the first network device on at least one active carrier.

Optionally, when the at least one first carrier is not uplink-only, the following step S106' (represented by a dashed line in the figure) may be performed.

S106': The first network device sends second feedback information to the terminal device.

Correspondingly, the terminal device receives the second feedback information corresponding to the at least one active carrier.

Different than the embodiment shown in FIG. 4, the first network device may send the second feedback information by using a few downlink slots. The second feedback information includes a TA corresponding to the at least one active carrier. Optionally, the second feedback information may be a random access response message.

In some embodiments, the first network device may send the second feedback information by using a few downlink slots, so that the terminal device may obtain, based on the second feedback information through random access, a TA value corresponding to the active carrier.

In an LTE communication process, the terminal device may obtain a corresponding TA value through random access, or on a carrier with downlink transmission being performed, the terminal device in a timing advance group (TAG) may obtain a corresponding TA value by using RRC signaling. Random access is performed by the terminal device by sending a preamble on a physical random access channel (PRACH).

In the following embodiments, it is considered that both an uplink signal for obtaining the TA and a signal for uplink measurement are sent, to implement effective resource utilization and reduce uplink signaling overheads.

For details, refer to FIG. 6. FIG. 6 is still another schematic flowchart of a communication method according to an embodiment of this application.

A terminal device sends a first uplink signal to a first network device on at least one first carrier. The first uplink signal is used for obtaining TA and uplink measurement. The first uplink signal includes a SRS, a preamble code, a DMRS, a CSI-RS, or any defined sequence. Optionally, obtaining TA may be understood as random access initiating. The following uses an example in which the first uplink signal is a preamble code.

For example, the method may include:

S201: The terminal device sends a first preamble sequence to the first network device on the at least one first carrier.

Correspondingly, the first network device receives the first preamble sequence on the at least one first carrier.

The terminal device sends the first preamble sequence to the first network device on the at least one first carrier. The first preamble sequence is used for obtaining TA and uplink measurement.

When configuring a resource of an uplink measurement signal for the first network device/terminal device, a second network device may further indicate that the resource is used for random access. In other words, the second network device may indicate that the resource may be used for random access in addition to uplink measurement. Alternatively, when configuring a resource for random access for the first network device/terminal device, the second network device may further indicate that the resource is used for uplink measurement. In other words, the second network device may indicate that the resource may be used for uplink measurement in addition to random access.

In some embodiments, optionally, when configuring a resource of the uplink measurement signal for the first network device/terminal device, the second network device indicates that the resource is used for both obtaining TA and uplink measurement. In this way, the first network device/ terminal device can perform identification. Optionally, when the terminal device periodically sends or is triggered to send the uplink measurement signal, the first network device can correspondingly perform receiving. Certainly, the resource of the uplink measurement signal may alternatively be determined by the first network device and exchanged to the second network device.

In an embodiment, when configuring a resource identifier of the uplink measurement signal for the first network device/terminal device, the second network device indicates that the resource is used for both obtaining TA and uplink measurement. In another embodiment, when the second network device configures a resource of the uplink measurement signal for the first network device/terminal device, indication information is added, to identify that the resource of the uplink measurement signal is used for both obtaining TA and uplink measurement; or indication information is added, to identify whether the resource of the uplink measurement signal is used for both obtaining TA and uplink measurement. Optionally, the indication information is one bit.

In some embodiments, the resource of the uplink measurement signal may be separately configured for different carrier identifiers related to a second frequency band, or may indicate TDD transmission patterns on different carriers for a same configuration. Symbol position of the uplink measurement signal may be consecutive symbols in a slot, or may be non-consecutive symbols. Any OFDM position in a slot may be occupied.

S202: The first network device determines signal strength of the first preamble sequence on the at least one first carrier.

Same as step S102 shown in FIG. 4, the first network device measures the first preamble sequence received on the at least one first carrier, to obtain the signal strength of the first preamble sequence on the at least one first carrier.

S203: The first network device determines an active carrier in the at least one first carrier based on the signal strength of the first preamble sequence on the at least one first carrier. The first network device determines a timing advance value corresponding to the active carrier.

The determining the active carrier and the determining the timing advance value are in no sequence. The TA may be first determined, and then the active carrier is determined; or the active carrier may be first determined, and then the TA is determined; or the active carrier and the TA may be determined at the same time.

Same as step S103 shown in FIG. 4, the first network device determines the active carrier based on the signal strength of the first preamble sequence on the at least one first carrier. In addition, the first network device may further determine a TA value corresponding to the active carrier. One active carrier may correspond to one TA value. That is, active carriers and TA values are in a one-to-one correspondence; or at least one active carrier corresponds to one TA value; or at least one active carrier is grouped into one carrier group, and one carrier group corresponds to one TA value. That is, active carriers in the carrier group have a common TA value. The correspondence between the carrier group and the active carrier may be preconfigured or pre-defined by using RRC signaling, or may be determined based on a correlation in obtaining TA. That is, when TAs of a plurality of active carriers are correlated, similar, or approximate, the plurality of active carriers are determined as one carrier group.

S204: The first network device sends fourth indication information to the second network device, where the fourth indication information includes information about the active carrier in the at least one first carrier and a timing advance value corresponding to the active carrier.

Correspondingly, the second network device receives the fourth indication information.

When the at least one first carrier is uplink-only, the first network device sends the fourth indication information to the second network device. The fourth indication information is used for responding to the initiated random access and uplink measurement. The fourth indication information includes the information about the active carrier in the at least one first carrier and the TA value corresponding to the active carrier.

When the at least one first carrier is uplink-dominant, the first network device may send first feedback message to the terminal device on a first slot. The first slot is a downlink slot configured by the first network device for the terminal device. In an example, the first feedback information is a RAR message.

In addition, the fourth indication information may further include first identification information and/or second identification information corresponding to the terminal device.

In some embodiments, the first identification information includes at least one of the following: a cell radio network temporary identifier (C-RNTI), a sequence identifier corresponding to an uplink signal. The C-RNTI is an identifier allocated by the second network device to the terminal device.

In some embodiments, the second identification information includes at least one of the following: a sequence identifier corresponding to an uplink signal and a resource identifier corresponding to the uplink signal. The sequence identifier is an SRS sequence, a preamble sequence, or any newly defined sequence (for example, a ZC sequence or an m sequence) used for identifying the UE. The resource identifier corresponding to the uplink signal is a resource index of the uplink signal or a resource index of a set in which the uplink signal is located.

In some embodiments, the sequence includes a ZC sequence, or an m-sequence, or any combination sequence of a ZC sequence and an m-sequence. Similarly, any newly defined sequence may also be understood as any newly defined ZC sequence, or an m sequence, or any combination sequence of a ZC sequence and an m sequence.

S205: The second network device sends the first feedback information to the terminal device.

Correspondingly, the terminal device receives the first feedback information.

The first feedback information includes the information about the active carrier in the at least one first carrier and the timing advance value corresponding to the active carrier.

The first feedback information may further include the first identification information and/or the second identification information corresponding to the terminal device.

The first identifier may be used for scrambling of cyclic redundancy check (CRC) of uplink transmission performed by the terminal device on any obtained active carrier. Optionally, after the first network device determines the active carrier for the terminal device, the information included in the first feedback information may be sent by the second network device to the first network device through an X2 interface or a backhaul link between network devices. To be specific, the first feedback information is determined based on the fourth indication information.

Optionally, when the at least one first carrier is uplink-only, the first network device may send the fourth indication information to the second network device. Then, the second network device broadcasts system information (SI), and the terminal device receives the SI. The SI includes a master information block (MIB) and a plurality of system information blocks (SIBs). In some embodiments, the information about the active carrier in the at least one first carrier and the TA value corresponding to the active carrier are mainly carried by using the SIBs. In addition, the SIBs may further include the first identification information and/or the second identification information corresponding to the terminal device. Optionally, when the at least one first carrier is uplink-dominant, the first network device may broadcast the SIBs, and the terminal device receives the SIBs.

In some embodiments, optionally, the C-RNTI may be indicated by the second network device to the first network device through an interface between networks. The C-RNTI indicated to the first network device may be used by the first network device to perform data transmission scheduling of the terminal device on a few downlink slots. The data transmission is uplink data transmission.

The following embodiments may use an RAR message as the first feedback information for description.

When the at least one first carrier is uplink-only, the second network device sends the RAR message to the terminal device after receiving the fourth indication information from the first network device. After receiving the RAR message, the terminal device may obtain information about an active carrier in the RAR message, to determine an active carrier used for access and uplink information transmission; and may obtain a TA value corresponding to the active carrier, to synchronize with the first network device on the corresponding active carrier based on the TA value, and perform uplink communication with the first network device on the active carrier.

When the at least one first carrier is uplink-dominant, the terminal device receives the RAR message from the first network device.

It may be understood that, in the process of simultaneously performing uplink measurement and random access, only the first preamble sequence needs to be sent and the RAR message needs to be received. There is no need to send a message 3 and receive a message 4 additionally.

According to the communication method provided in some embodiments, the random access process and the uplink signal measurement process are simultaneously performed, to obtain the timing advance value used for synchronization of the terminal device, and accurately determine the information about the active carrier in the at least one first carrier based on the signal strength of the first preamble sequence. This improves reliability of communication on the active carrier, and reduces signaling overheads in a random access process and an uplink signal measurement process.

Different than the embodiment shown in FIG. 6, random access and uplink measurement may not be simultaneously performed, but random access is performed only when the first uplink signal is detected by the first network device and a corresponding active carrier is determined.

Any conceptual explanation or disclosure in any embodiment of the application may also be applicable to any other embodiment, such as the following embodiments.

Figure 7:
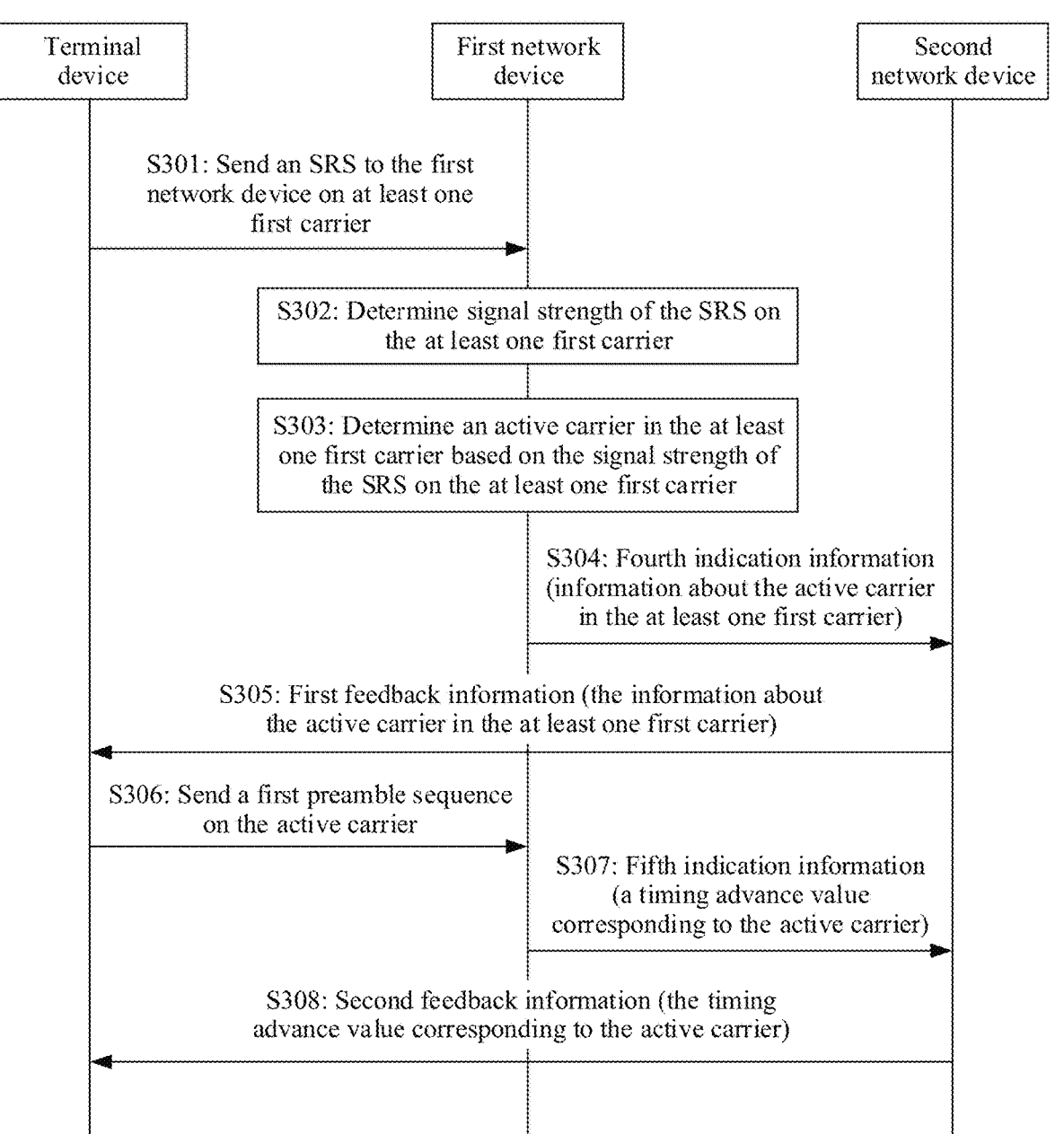
FIG. 7 is still another schematic flowchart of a communication method according to an embodiment of this application.

For details, refer to FIG. 7. FIG. 7 is still another schematic flowchart of a communication method according to an embodiment of this application.

A terminal device sends a first uplink signal to a first network device on at least one first carrier. The first uplink signal is used for uplink measurement. The first uplink signal includes a SRS, a preamble code, a DMRS, a CSI-RS, or any defined sequence. The following uses an example in which the first uplink signal is an SRS.

For example, the method may include:

S301: The terminal device sends an SRS to the first network device on the at least one first carrier.

Correspondingly, the first network device receives the SRS on the at least one first carrier.

In some embodiments, the SRS is used only for uplink measurement. Certainly, the terminal device may alternatively send another uplink measurement signal, for example, a preamble, a DMRS, or a newly defined sequence.

S302: The first network device determines signal strength of the SRS on the at least one first carrier.

For some implementations of this step, refer to step S102 in the embodiment shown in FIG. 4 and step S202 in the embodiment shown in FIG. 6.

S303: The first network device determines an active carrier in the at least one first carrier based on the signal strength of the SRS on the at least one first carrier.

In this step, the active carrier is determined only based on the signal strength of the SRS on the at least one first carrier. For some implementations, refer to step S103 in the embodiment shown in FIG. 4.

S304: The first network device sends fifth indication information to a second network device, where the fifth indication information includes information about the active carrier in the at least one first carrier.

Correspondingly, the second network device detects the fifth indication information.

In this step, the fifth indication information includes the information about the active carrier in the at least one first carrier. The fifth indication information does not include a TA. The fifth indication information further includes second identification information corresponding to the terminal device. Information about first identifier information and/or second identifier information is described above. Details are not described again. For some implementations, refer to step S104 in the embodiment shown in FIG. 4.

S305: The second network device sends first feedback information to the terminal device.

Correspondingly, the terminal device receives the first feedback information. The first feedback information includes the information about the active carrier in the at least one first carrier. The first feedback information is determined based on the fifth indication information. The fifth indication information is information transmitted on an interface between network devices, and the first feedback information is information sent by the network device to the terminal device. The first feedback information is determined based on the fifth indication information. The fifth indication information and the first feedback information may be same information, or may be different information. Content included in the fifth indication information and the first feedback information may be completely the same or partially the same. When the fifth indication information is completely the same as the first feedback information, the second network device sending the first feedback information may be understood as forwarding the fifth indication information.

For some implementations of this step, refer to step S105 in the embodiment shown in FIG. 4.

S306: The terminal device sends a first preamble sequence to the first network device on the active carrier.

Correspondingly, the first network device detects the first preamble sequence.

After the terminal device obtains the active carrier determined by the first network device, the terminal device sends the first preamble sequence to the first network device on the active carrier. The first preamble sequence is used for initiating random access, and obtaining a TA value corresponding to the active carrier.

If the first network device determines a plurality of active carriers, the terminal device may separately send the first preamble sequence on the plurality of active carriers, to obtain a TA value corresponding to each active carrier.

S307: The first network device sends sixth indication information to the second network device, where the sixth indication information includes a TA value corresponding to the active carrier.

Correspondingly, the second network device detects the sixth indication information.

After receiving the first preamble sequence on the active carrier, the first network device determines the TA value corresponding to the active carrier.

When the at least one first carrier is uplink-only, the first network device sends the sixth indication information to the second network device. The sixth indication information indicates information used for responding to the initiated random access. Different than the TA value of the at least one active carrier included in the fourth indication information in the embodiment shown in FIG. 6, in some embodiments, the sixth indication information includes a TA value corresponding to each active carrier. That is, the TA value is specific to the active carrier. The terminal device communicates on the active carrier by using the TA value, so that precise synchronization with the first network device can be implemented.

The sixth indication information further includes the first identification information. For content and beneficial effects of the first identification information, refer to the foregoing descriptions. Details are not described again.

S308: The second network device sends second feedback information to the terminal device.

Correspondingly, the terminal device receives the second feedback information. The second feedback information is determined based on the sixth indication information. For example, the second feedback information is an RAR.

The second feedback information includes a TA value corresponding to the at least one active carrier.

The second feedback information further includes the first identification information.

When the at least one first carrier is uplink-only, the second network device sends the RAR message to the terminal device after receiving the sixth indication information from the first network device. After receiving the RAR message, the terminal device may obtain a TA value corresponding to the active carrier, to synchronize with the first network device on the corresponding active carrier based on the TA value, and perform uplink communication with the first network device on the active carrier.

According to the communication method provided in some embodiments, the signal strength of the first uplink signal sent by the terminal device on the at least one first carrier is determined, to accurately determine the active carrier in the at least one first carrier, and improve reliability of communication on the active carrier. Then, random access is performed on the determined active carrier, to obtain a TA value for the active carrier. In this way, the terminal device communicates on the active carrier by using the TA value, to implement precise synchronization with the first network device and improve reliability of communication.

Different than FIG. 6 and FIG. 7, random access may first be performed on one carrier, and then uplink measurement is performed on another carrier based on an approximate TA value obtained through random access.

Figure 8:
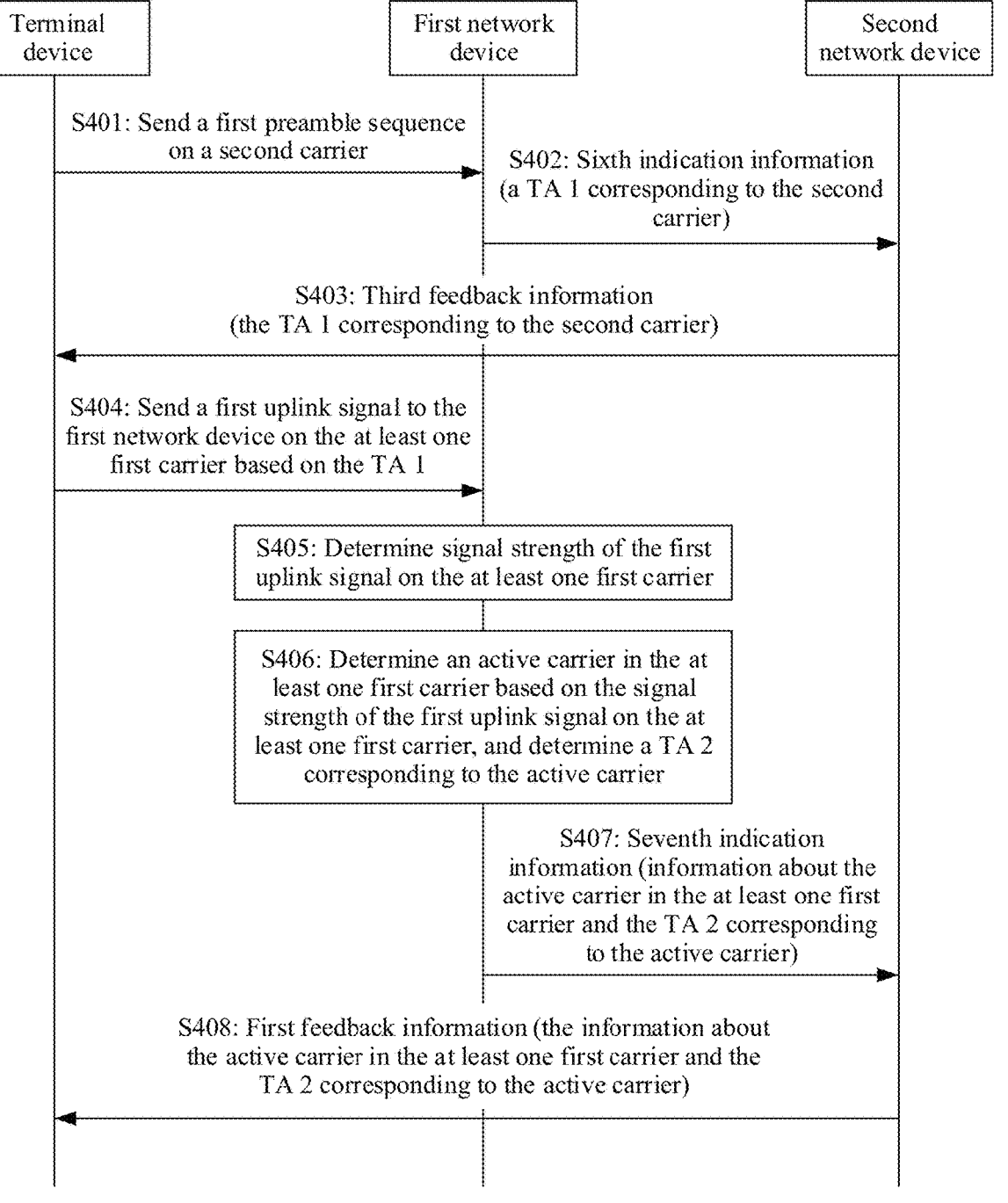
FIG. 8 is still another schematic flowchart of a communication method according to an embodiment of this application.

For details, refer to FIG. 8. FIG. 8 is still another schematic flowchart of a communication method according to an embodiment of this application. For example, the method may include:

S401: A terminal device sends a first preamble sequence to a first network device on a second carrier.

Correspondingly, the first network device receives the first preamble sequence.

In some embodiments, the first preamble sequence is used for random access. The second carrier is different from a first carrier on which an uplink measurement signal is sent.

S402: The first network device sends seventh indication information to a second network device, where the seventh indication information includes a TA 1 corresponding to the second carrier.

After receiving the first preamble sequence, the first network device determines the TA 1. The TA 1 corresponds to the second carrier.

When the at least one first carrier is uplink-only, the first network device sends the seventh indication information to the second network device after determining the TA 1. The seventh indication information includes the TA 1 corresponding to the second carrier.

S403: The second network device sends third feedback information to the terminal device.

The third feedback information includes the TA 1 corresponding to the second carrier.

After receiving the seventh indication information sent by the first network device, the second network device sends the third feedback information to the terminal device. For example, the third feedback information is an RAR. The third feedback information is determined based on the seventh indication information. The seventh indication information and the third feedback information may be same information, or may be different information. Content included in the seventh indication information and the third feedback information may be completely the same or partially the same. When the seventh indication information is completely the same as the third feedback information, the second network device sending the third feedback information may be understood as forwarding the seventh indication information.

S404: The terminal device sends a first uplink signal to the first network device on the at least one first carrier based on the TA 1.

Correspondingly, the first network device detects the first uplink signal.

After receiving the third feedback information, the terminal device obtains the TA 1, and the TA 1 may be used as an initial TA value for uplink transmission. Therefore, the terminal device sends the first uplink signal to the first network device on the at least one first carrier based on the TA 1. The first uplink signal is used for uplink measurement. Certainly, the terminal device may send another uplink measurement signal, for example, an SRS, a DMRS, or any newly defined sequence, to the first network device on the at least one first carrier.

S405: The first network device determines signal strength of the first uplink signal on the at least one first carrier.

For some implementations of this step, refer to step S103 in the embodiment shown in FIG. 4, step S202 in the embodiment shown in FIG. 6, or step S302 in the embodiment shown in FIG. 7.

S406: The first network device determines an active carrier in the at least one first carrier based on the signal strength of the first uplink signal on the at least one first carrier. Optionally, the first network device may further determine a TA 2 corresponding to the active carrier.

For some implementations of this step, refer to step S203 in the embodiment shown in FIG. 5. Herein, the first network device re-determines, based on the received first uplink signal, the TA 2 corresponding to the active carrier. Precision of synchronizing the terminal device with the first network device on the active carrier by using the TA 2 is higher than precision of synchronizing the terminal device with the first network device on the active carrier by using the TA 1.

The TA 2 may be an offset relative to the TA 1.

S407: The first network device sends eighth indication information to the second network device, where the eighth indication information includes information about the active carrier in the at least one first carrier. Optionally, the eighth indication information further includes the TA 2 corresponding to the active carrier.

Correspondingly, the second network device receives the eighth indication information.

For some implementations of this step, refer to step S204 in the embodiment shown in FIG. 5.

S408: The second network device sends first feedback information to the terminal device.

The first feedback information includes the information about the active carrier in the at least one first carrier.

Correspondingly, the terminal device receives the first feedback information. Optionally, the first feedback information is an RAR message. The first feedback information includes the information about the active carrier in the at least one first carrier. Optionally, the first feedback information further includes the TA 2 corresponding to the active carrier. The first feedback information is determined based on the eighth indication information. The eighth indication information and the first feedback information may be same information, or may be different information. Content included in the eighth indication information and the first feedback information may be completely the same or partially the same. When the eighth indication information is completely the same as the first feedback information, the second network device sending the first feedback information may be understood as forwarding the eighth indication information.

For some implementations of this step, refer to step S205 in the embodiment shown in FIG. 5.

According to the communication method provided in some embodiments, the terminal device may send an uplink measurement signal based on an initial TA value. After receiving the uplink measurement signal, the first access network device may determine an active carrier, and determine a TA value or a TA offset value corresponding to the active carrier. This improves synchronization precision and communication reliability.

Figure 9:
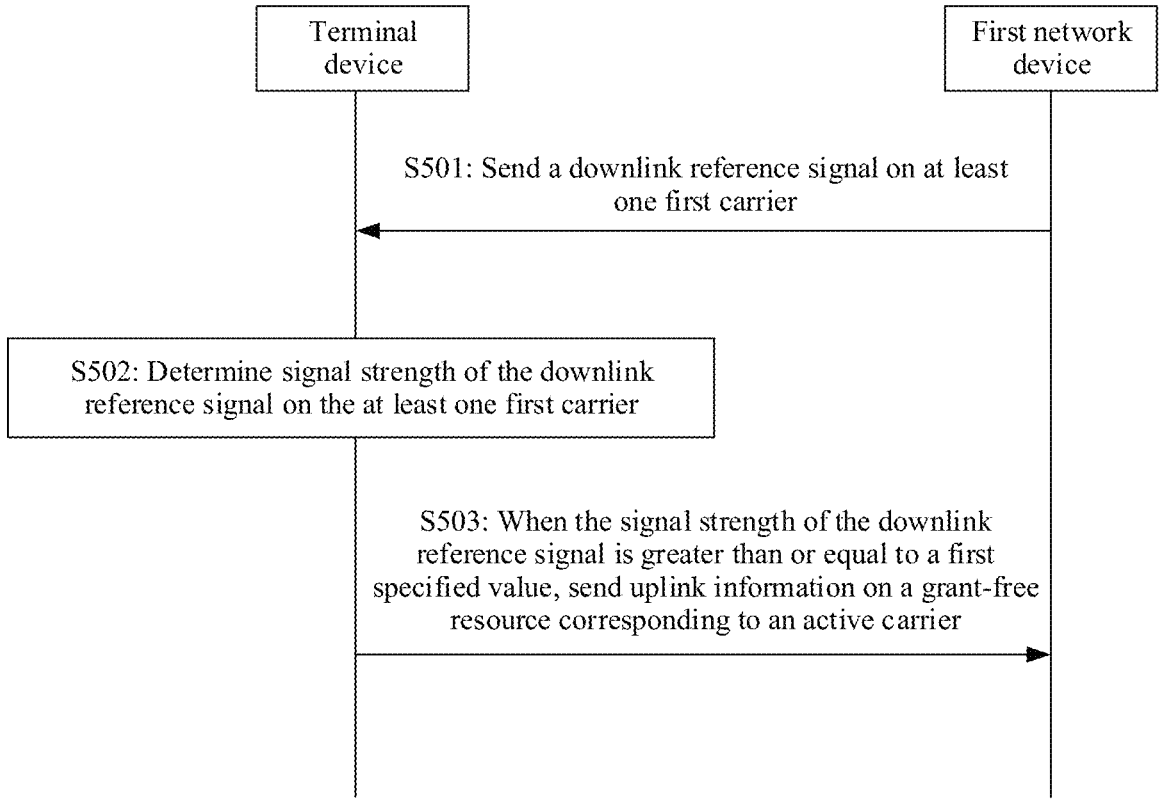
FIG. 9 is still another schematic flowchart of a communication method according to an embodiment of this application.

FIG. 9 is still another schematic flowchart of a communication method according to an embodiment of this application. For example, the method may include:

S501: A first network device sends a downlink reference signal on at least one first carrier.

Correspondingly, a terminal device detects the downlink reference signal from the first network device on the at least one first carrier.

For example, the first network device sending the downlink reference signal to the terminal device is periodically sending the downlink reference signal to the terminal device.

In some embodiments, there are a few downlink slots between the first network device and the terminal device. The first network device may periodically send the downlink reference signal to the terminal device by using the few downlink slots. The downlink reference signal may be a physical broadcast channel/synchronization signal block (PBCH/SS block), a CSI-RS, or the like. In addition, density of the downlink reference signal may be high density. The density of the downlink reference signal may be configured by a second network device for the terminal device.

In some embodiments, a small quantity of downlink slots may mean that every X slots are considered as a slot configuration period, there are Y downlink slots in the period, and all remaining X-Y slots are uplink slots. X may be a positive integer greater than Y, for example, 20, 30, 40, or 60. Correspondingly, Y is a positive integer smaller than X, for example, 1, 2, or 3. For example, when uplink and downlink slots are configured as one downlink slot and X−1 uplink slots that are sequentially cyclic, or are configured as X−1 uplink slots and one downlink slot that are sequentially cyclic, there are a small quantity of downlink slots. If one slot includes a downlink symbol, the slot may be referred to as a downlink slot. To be specific, the downlink slot may be understood as a slot including a downlink symbol. Downlink symbols may be consecutive or non-consecutive. Optionally, a band width or a BWP or a PRB on which the downlink symbol is located is configurable.

In the embodiments of this application, any "configurable" or "configure" may be understood as being configured by the first network device or the second network device by using RRC signaling, or may be understood as being configured by the first network device or the second network device by using MAC layer signaling or physical layer signaling. For example, the first network device or the second network device may configure, by using RRC signaling, a quantity of downlink symbols included in the downlink slot.

S502: The terminal device determines signal strength of the downlink reference signal on the at least one first carrier.

After detecting the downlink reference signal, the terminal device performs signal measurement on the downlink reference signal to obtain the signal strength. The signal strength may be one or more of the foregoing RSRP, RSRQ, or RSSI.

S503: When the signal strength of the downlink reference signal is greater than or equal to a first specified value, the terminal device sends uplink information to the first network device on a grant-free resource corresponding to an active carrier. The active carrier is at least one of the at least one first carrier.

Correspondingly, when the signal strength of the downlink reference signal is greater than or equal to the first specified value, the first network device detects the uplink information from the terminal device on the grant-free resource corresponding to the active carrier.

When the signal strength of the downlink reference signal is greater than or equal to the first specified value, correspondingly, uplink channel performance is good based on uplink and downlink consistency. In this case, the terminal device may perform uplink transmission on the grant-free resource corresponding to the active carrier. The active carrier may be a serving carrier or an operating carrier determined based on the foregoing embodiments. The active carrier is at least one of the at least one first carrier. When uplink channel performance is good, uplink transmission can be performed, to improve communication reliability.

According to the communication method provided in some embodiments, a downlink reference signal detected on a few downlink slots is used. When signal strength of the downlink reference signal is high, a grant-free resource is active for uplink transmission. This improves communication reliability.

Figure 10:
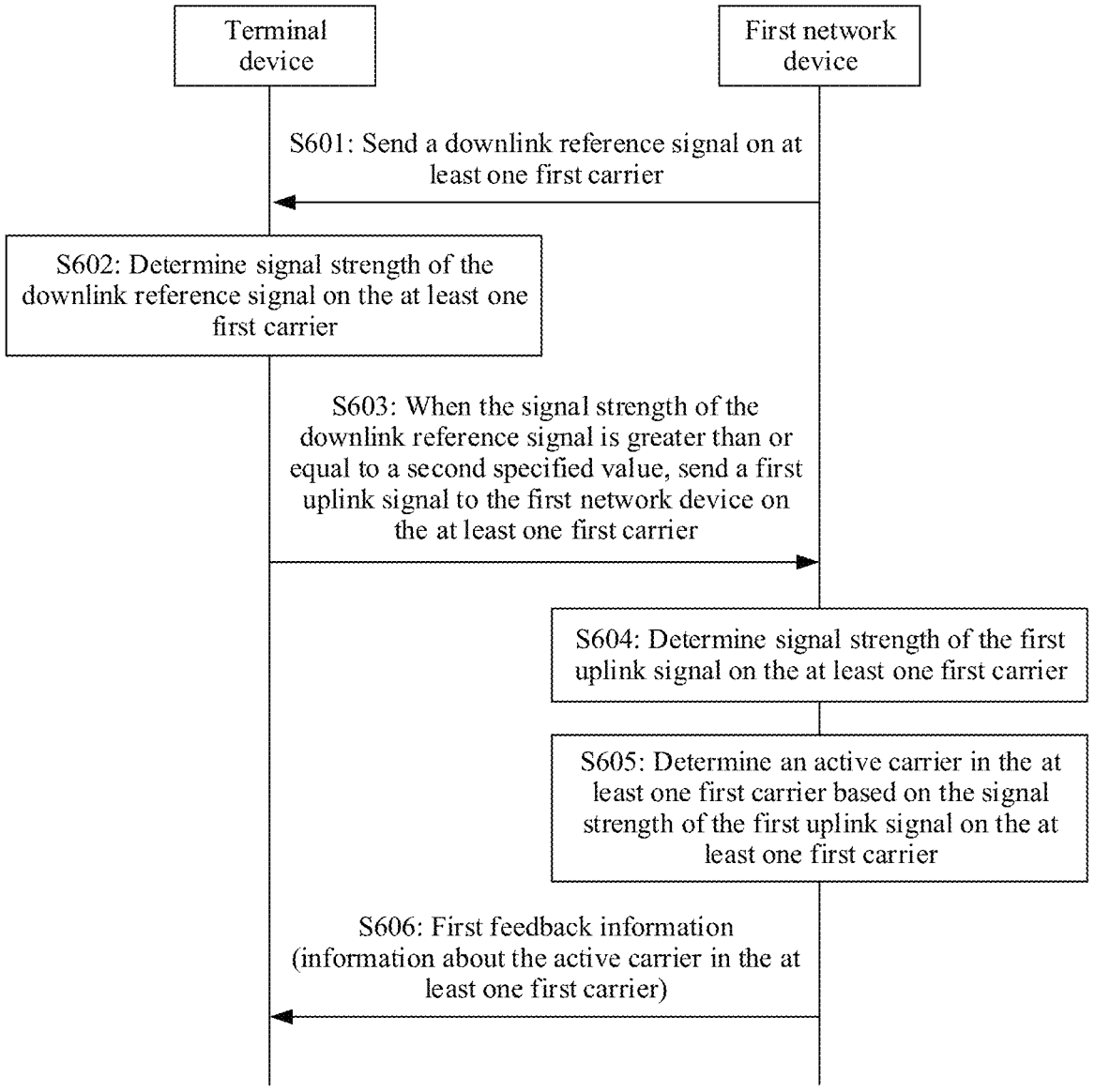
FIG. 10 is still another schematic flowchart of a communication method according to an embodiment of this application.

FIG. 10 is still another schematic flowchart of a communication method according to an embodiment of this application. For example, the method may include:

S601: A first network device sends a downlink reference signal on at least one first carrier.

Correspondingly, the terminal device detects the downlink reference signal on the at least one first carrier. For example, the first network device sending the downlink reference signal to the terminal device is periodically sending the downlink reference signal to the terminal device.

In some embodiments, there are a few downlink slots between the first network device and the terminal device. How to understand a small quantity of downlink slots is described above. Details are not described again. The first network device may periodically send the downlink reference signal to the terminal device by using the few downlink slots. The downlink reference signal may be a PBCH/SS block, a CSI-RS, or the like. In addition, density of the downlink reference signal may be high density. The density of the downlink reference signal may be configured by a second network device for the terminal device.

Optionally, a time delay obtained by detecting the downlink reference signal by the terminal device may be used as an initial uplink TA reference value on the frequency band, to implement initial alignment with the first network device.

S602: The terminal device determines signal strength of the downlink reference signal on the at least one first carrier.

After detecting the downlink reference signal, the terminal device performs signal measurement on the downlink reference signal to obtain the signal strength. The signal strength may be one or more of the foregoing RSRP, RSRQ, or RSSI.

S603: When the signal strength of the downlink reference signal is greater than or equal to a second specified value, the terminal device sends a first uplink signal to the first network device on the at least one first carrier.

Correspondingly, the first network device receives the first uplink signal on the at least one first carrier.

When the signal strength of the downlink reference signal obtained through measurement is greater than or equal to the second specified value, the terminal device is triggered to send the first uplink signal to the first network device on the at least one first carrier. In this way, redundant transmission when the terminal device is far away from the first network device can be avoided, and power consumption of the terminal device can be reduced. Optionally, the second specified value may be greater than or equal to the first specified value in the embodiment shown in FIG. 9, or may not be limited thereto.

For some implementations of the terminal device sending the first uplink signal, refer to step S101 in the embodiment shown in FIG. 4, step S201 in the embodiment shown in FIG. 6, or the like.

In addition, a time delay obtained by detecting the downlink reference signal by the terminal device may be used as an initial uplink TA reference value on the frequency band, to implement initial alignment with the first network device. Therefore, in this step, new random access does not need to be initiated on the frequency band (the at least one first carrier), and the first uplink signal may be sent based on the initial TA reference value. For further calibration of the TA value, refer to the embodiment shown in FIG. 8. Therefore, a rough timing is obtained with reference to downlink synchronization, and TA adjustment may be further obtained by using an uplink signal, to reduce random access signaling.

S604: The first network device determines signal strength of the first uplink signal on the at least one first carrier.

For some implementations of this step, refer to step S102 in the embodiment shown in FIG. 4, step S202 in the embodiment shown in FIG. 6, or the like.

S605: The first network device determines an active carrier in the at least one first carrier based on the signal strength of the first uplink signal on the at least one first carrier.

For some implementations of this step, refer to step S103 in the embodiment shown in FIG. 4, step S203 in the embodiment shown in FIG. 6, or the like.

S606: The first network device sends first feedback information to the terminal device, where the first feedback information includes information about the active carrier in the at least one first carrier.

Correspondingly, the terminal device receives the first feedback information.

The first network device may send the first feedback information to the terminal device on a few downlink slots. The first feedback information includes the information about the active carrier in the at least one first carrier.

Optionally, in step S601, if the terminal device obtains the initial UL TA reference value based on the downlink reference signal, the first feedback information may further include a UL TA offset value. The offset value is used for adjusting the UL TA.

A grant-free resource is usually used for uplink communication, and grant-free resources corresponding to different carriers are preconfigured. The grant-free resource, also referred to as a configured grant resource, includes two types: a type 1 and a type 2. The grant-free resource of the type 1 is semi-statically configured, and the network device does not need to deliver dynamic indication information for activation. The grant-free resource of the type 2 is semi-statically configured, and needs to be active by using dynamic downlink control information (DCI).

In an embodiment, the grant-free resource is active based on the active carrier in the first feedback information. Correspondingly, the grant-free resource corresponding to the active carrier is active, and the grant-free resource can be effectively used. Optionally, the first feedback information may alternatively include second indication information, and the second indication information indicates that the grant-free resource corresponding to the active carrier is active. In this way, the terminal device can send uplink information to the first network device on the grant-free resource corresponding to the active carrier. Optionally, in this case, the grant-free resource of the type 1 is used.

In an embodiment, the first network device needs to activate the grant-free resource. Optionally, in this case, the grant-free resource of the type 2 is used.

In an implementation, the first network device may use newly defined DCI, that is, send first DCI to the terminal device on the active carrier. The first DCI includes at least one field (e.g., segment), or referred to as at least one information block. The at least one field or information block includes at least one of the following information: trigger indication information (e.g., trigger bit), an active carrier identifier, and a grant-free resource set identifier. The trigger indication information is used for activating the grant-free resource corresponding to the active carrier. After receiving the first DCI, the terminal device may send the first uplink signal by using the active grant-free resource corresponding to the active carrier.

In still another implementation, the first network device may multiplex DCI in an existing form, that is, send second DCI to the terminal device on the active carrier. The second DCI is used for triggering transmission of the first uplink signal. That is, the second DCI is used for triggering uplink measurement. In this case, after receiving the second DCI, the terminal device may send the first uplink signal by using the active grant-free resource of the type 2 corresponding to the active carrier. Optionally, the second DCI may further include the trigger indication information, and the trigger indication information is used for activating the grant-free resource corresponding to the active carrier.

According to the communication method provided in some embodiments, when the signal strength of the downlink reference signal is strong, the terminal device may send an uplink measurement signal to the first network device, to avoid redundant transmission when the terminal device is far away from the first network device, and reduce power consumption of the terminal device.

It may be understood that, in the foregoing embodiments, methods and/or steps implemented by the terminal device may alternatively be implemented by a component (for example, a chip or a circuit) that can be used in the terminal device, and methods and/or steps implemented by the first network device may alternatively be implemented by a component (for example, a chip or a circuit) that can be used in the first network device.

The foregoing mainly describes the solutions provided in embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the first network device in the foregoing method embodiments, or an apparatus including the foregoing first network device, or a component that can be used in the first network device. It may be understood that, to implement the foregoing functions, the communication apparatus includes a hardware structure and/or a software module for performing a corresponding function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In some implementations, another division manner may be used.

Figure 11:
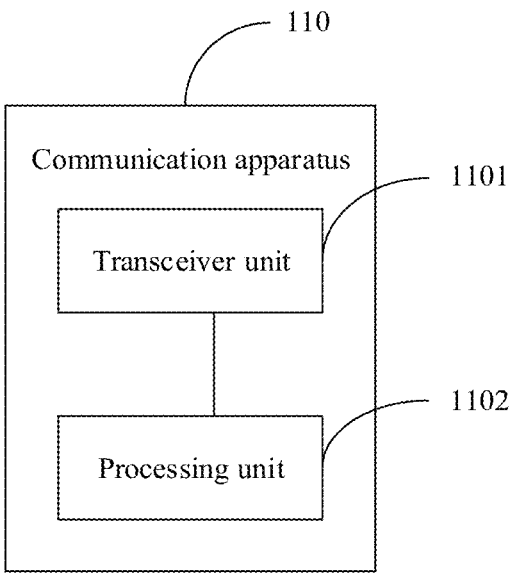
FIG. 11 is a schematic diagram of a structure of a communication apparatus 110 according to an embodiment of this application.

FIG. 11 is a schematic diagram of a structure of a communication apparatus 110. The communication apparatus 110 includes a transceiver unit 1101 and a processing unit (e.g., processing circuit) 1102. The transceiver unit 1101 may alternatively be referred to as a transceiver unit configured to implement a transceiver function, for example, may be a transceiver circuit, a transceiver machine, a transceiver, or a communication interface.

For example, the communication apparatus 110 is the terminal device in the method embodiments shown in FIG. 4 to FIG. 8.

The transceiver unit 1101 is configured to send a first uplink signal to a first network device on at least one first carrier. The transceiver unit 1101 is further configured to receive first feedback information. The first feedback information includes information about an active carrier in the at least one first carrier.

Optionally, the transceiver unit 1101 is further configured to receive the first feedback information from a second network device; or the transceiver unit 1101 is further configured to receive the first feedback information from the first network device.

Optionally, the transceiver unit 1101 is further configured to receive the first feedback information from the first network device by using a first slot. The first slot is a downlink slot configured by the first network device for the terminal device.

For example, the communication apparatus 110 is the first network device or the second network device in the method embodiments shown in FIG. 4 to FIG. 8.

The processing unit 1102 is configured to detect a first uplink signal on at least one first carrier; the processing unit 1102 is further configured to determine signal strength of the first uplink signal on the at least one first carrier; the processing unit 1102 is further configured to determine an active carrier in the at least one first carrier based on the signal strength of the first uplink signal on the at least one first carrier; and the transceiver unit 1101 is configured to send first feedback information. The first feedback information includes information about the active carrier in the at least one first carrier.

Optionally, the transceiver unit 1101 is further configured to send first indication information to a second network device, where the first indication information includes the information about the active carrier in the at least one first carrier; or the transceiver unit 1101 is further configured to send the first feedback information to a terminal device.

Optionally, the transceiver unit 1101 is further configured to send the first feedback information by using a first slot. The first slot is a downlink slot configured by the first network device for the terminal device.

For example, the communication apparatus 110 is the terminal device in the method embodiment shown in FIG. 9.

The processing unit 1102 is configured to detect a downlink reference signal from a first network device on at least one first carrier; the processing unit is further configured to determine signal strength of the downlink reference signal; and the transceiver unit 1101 is configured to: when the signal strength of the downlink reference signal is greater than or equal to a first specified value, send uplink information to the first network device on a grant-free resource corresponding to an active carrier.

For example, the communication apparatus 110 is the first network device in the method embodiment shown in FIG. 9.

The transceiver unit 1101 is configured to send a downlink reference signal on at least one first carrier; and the processing unit 1102 is configured to detect uplink information from a terminal device on a grant-free resource corresponding to an active carrier.

For example, the communication apparatus 110 is the terminal device in the method embodiment shown in FIG. 10.

The processing unit 1102 is configured to detect a downlink reference signal from a first network device on at least one first carrier; the processing unit is further configured to determine signal strength of the downlink reference signal; and the transceiver unit 1101 is configured to: when the signal strength of the downlink reference signal is greater than a second specified value, send a first uplink signal to the first network device on the at least one first carrier.

Optionally, the transceiver unit 1101 is further configured to receive first feedback information. The first feedback information includes information about an active carrier in the at least one first carrier.

Optionally, the processing unit 1102 is further configured to determine an initial uplink timing advance based on the downlink reference signal.

Optionally, the transceiver unit 1101 is further configured to receive first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the transceiver unit 1101 is further configured to receive second downlink control information, where the second downlink control information is used for triggering transmission of the first uplink signal, and the second downlink control information includes the trigger indication information.

For example, the communication apparatus 110 is the first network device in the method embodiment shown in FIG. 10.

The transceiver unit 1101 is configured to send a downlink reference signal on at least one first carrier; and the processing unit 1102 is configured to detect a first uplink signal sent by a terminal device on the at least one first carrier.

Optionally, the processing unit 1102 is further configured to determine signal strength of the first uplink signal on the at least one first carrier; the processing unit 1102 is further configured to determine an active carrier based on the signal strength of the first uplink signal on the at least one first carrier; and the transceiver unit 1101 is further configured to send first feedback information. The first feedback information includes information about the active carrier in the at least one first carrier.

Optionally, the transceiver unit 1101 is configured to send first indication information to a second network device, where the first indication information includes the information about the active carrier in the at least one first carrier; or the transceiver unit 1101 is further configured to send the first feedback information to the terminal device.

Optionally, the transceiver unit 1101 is configured to send first downlink control information, where the first downlink control information includes at least one field, each field includes at least one piece of the following information: trigger indication information, a carrier identifier, and a grant-free resource set identifier, and the trigger indication information is used for activating a grant-free resource corresponding to the active carrier; or the transceiver unit 1101 is configured to send second downlink control information, where the second downlink control information is used for triggering transmission of the first uplink signal, and the second downlink control information includes the trigger indication information.

All related content of the steps in the foregoing method embodiments may be cited in function descriptions of corresponding functional units. Details are not described herein again.

In some embodiments, the communication apparatus 110 is presented in a form of functional units obtained through division in an integrated manner. The "unit" herein may be an ASIC, a circuit, a processor and a memory that execute at least one software or firmware program, an integrated logic circuit, and/or another component that can provide the foregoing functions.

For example, the processor 301 in the communication apparatus 300 shown in FIG. 3 may invoke the computer-executable instructions stored in the memory 303, to enable the communication apparatus 300 to perform the communication methods in the foregoing method embodiments.

Functions/implementation processes of the transceiver unit 1101 and the processing unit 1102 in FIG. 11 may be implemented by the processor 301 in the communication apparatus 300 shown in FIG. 3 by invoking the computer-executable instructions stored in the memory 303. Alternatively, functions/implementation processes of the processing unit 1102 in FIG. 11 may be implemented by the processor 301 in the communication apparatus 300 shown in FIG. 3 by invoking the computer-executable instructions stored in the memory 303, and functions/implementation processes of the transceiver unit 1101 in FIG. 11 may be implemented by the communication interface 304 in the communication apparatus 300 shown in FIG. 3.

The communication apparatus 110 provided in this embodiment may perform the communication method in the foregoing method embodiments. Therefore, for technical effects that can be achieved by the communication apparatus 110, refer to the foregoing method embodiments. Details are not described herein again.

It should be noted that the foregoing units or at least one of the units may be implemented by software, hardware, or a combination thereof. When any one of the units or the units is implemented by using the software, the software exists in a form of computer program instructions, and is stored in the memory. The processor may be configured to execute the program instructions and implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing units or a unit are/is implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor executes a computer program or instructions in the memory, the method according to any one of the foregoing method embodiments is performed. Optionally, the chip system may include a chip, or may include a chip and another discrete component. This is not limited in embodiments of this application.

It should be understood that, in the descriptions of embodiments of this application, unless otherwise specified, "/" represents an "or" relationship between associated objects. For example, A/B may represent A or B, where A and B may be singular or plural. In addition, in the descriptions of embodiments of this application, unless otherwise stated, "a plurality of" means two or more than two. At least one of the following items (e.g., pieces) or a similar expression thereof indicates any combination of these items, including a single item (e.g., piece) or any combination of a plurality of items (e.g., pieces). For example, at least one item (e.g., piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in an embodiment of embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. Exactly, use of the word such as "example" or "for example" is intended to present a relative concept in a specific manner for ease of understanding.

All or a part of the foregoing embodiments may be implemented by using software, hardware, firmware, or any combination thereof. When a software program is used to implement the embodiments, all or a part of the embodiments may be implemented in a form of a computer program product. The computer program product includes at least one computer instruction. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates at least one usable medium. The usable medium may be a magnetic medium (for example, a floppy disk, a hard disk, or a magnetic tape), an optical medium (for example, a DVD), a semiconductor medium (for example, a solid-state disk (SSD)), or the like.

Although embodiments of this application are described herein with reference to the embodiments, in a process of implementing embodiments of this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although embodiments of this application are described with reference to specific features and the embodiments thereof, it is clear that various modifications and combinations may be made to embodiments of this application without departing from the spirit and scope of embodiments of this application. Correspondingly, the specification and the accompanying drawings are merely example descriptions of embodiments of this application that are defined by the appended claims, and are considered to cover any or all of modifications, variations, combinations, or equivalents in the scope of embodiments of this application. Clearly, a person skilled in the art can make various modifications and variations to embodiments of this application without departing from the spirit and scope of embodiments of this application. In this way, embodiments of this application are also intended to cover these modifications and variations provided that they fall within the scope of the claims of embodiments of this application and equivalent technologies thereof.

What is claimed is:

1. A communication method, wherein the method comprises:

sending a first uplink signal to a first network device separately on each of at least two first carriers; and receiving first feedback information, wherein the first feedback information comprises information about an active carrier in the at least two first carriers, and the active carrier is a serving carrier whose signal strength is greater than or equal to a preconfigured value.

2. The method according to claim 1, wherein the first feedback information further comprises a timing advance value corresponding to the active carrier, and wherein the timing advance value corresponds to at least one active carrier, the timing advance value is in a one-to-one correspondence with at least one active carrier, or the timing advance value corresponds to at least one active carrier group.

3. The method according to claim 1, wherein the first feedback information is a random access response message or system information.

4. The method according to claim 1, wherein the first uplink signal is a first preamble sequence, and the first uplink signal is used for random access and uplink measurement.

5. The method according to claim 1, wherein the receiving of the first feedback information comprises:

receiving the first feedback information from a second network device; or receiving the first feedback information from the first network device.

6. A communication method, wherein the method comprises:

detecting a first uplink signal on at least two first carriers;

determining signal strength of the first uplink signal on each of the at least two first carriers;

determining an active carrier in the at least two first carriers based on the signal strength of the first uplink signal on each of the at least two first carriers; and sending first feedback information, wherein the first feedback information comprises information about the active carrier in the at least two first carriers.

7. The method according to claim 6, wherein the first feedback information further comprises a timing advance value corresponding to the active carrier, and wherein the timing advance value corresponds to at least one active carrier, the timing advance value is in a one-to-one correspondence with at least one active carrier, or the timing advance value corresponds to at least one active carrier group.

8. The method according to claim 6, wherein the first feedback information is a random access response message or system information.

9. The method according to claim 6, wherein the first uplink signal is a first preamble sequence, and the first uplink signal is used for random access and uplink measurement.

10. The method according to claim 6, wherein the sending of the first feedback information comprises:

sending first indication information to a second network device, wherein the first indication information comprises the information about the active carrier in the at least one first carrier; or sending the first feedback information to a terminal device.

11. A communication apparatus, comprising:

a memory storage comprising instructions; and one or more processors in communication with the memory storage, wherein the instructions, when executed by the one or more processors, cause the apparatus to:

send a first uplink signal to a first network device separately on each of at least two first carriers; and receive first feedback information, wherein the first feedback information comprises information about an active carrier in the at least two first carriers, and the active carrier is a serving carrier whose signal strength is greater than or equal to a preconfigured value.

12. The apparatus according to claim 11, wherein the first feedback information further comprises a timing advance value corresponding to the active carrier, and wherein the timing advance value corresponds to at least one active carrier, the timing advance value is in a one-to-one correspondence with at least one active carrier, or the timing advance value corresponds to at least one active carrier group.

13. The apparatus according to claim 11, wherein the first feedback information is a random access response message or system information.

14. The apparatus according to claim 11, wherein the first uplink signal is a first preamble sequence, and the first uplink signal is used for random access and uplink measurement.

15. The apparatus according to claim 11, wherein the instructions, when executed by the one or more processors, further cause the apparatus to:

receive the first feedback information from a second network device; or receive the first feedback information from the first network device.

16. A communication apparatus, comprising:

a memory storage comprising instructions; and one or more processors in communication with the memory storage, wherein the instructions, when executed by the one or more processors, cause the apparatus to:

detect a first uplink signal on at least two first carriers;

determine signal strength of the first uplink signal on each of the at least two first carriers;

determine an active carrier in the at least two first carriers based on the signal strength of the first uplink signal on each of the at least two first carriers; and send first feedback information, wherein the first feedback information comprises information about the active carrier in the at least two first carriers.

17. The apparatus according to claim 16, wherein the first feedback information further comprises a timing advance value corresponding to the active carrier, and wherein the timing advance value corresponds to at least one active carrier, the timing advance value is in a one-to-one correspondence with at least one active carrier, or the timing advance value corresponds to at least one active carrier group.

18. The apparatus according to claim 16, wherein the first feedback information is a random access response message or system information.

19. The apparatus according to claim 16, wherein the first uplink signal is a first preamble sequence, and the first uplink signal is used for random access and uplink measurement.

20. The apparatus according to claim 16, wherein the instructions, when executed by the one or more processors, further cause the apparatus to:

send first indication information to a second network device, wherein the first indication information comprises the information about the active carrier in the at least one first carrier; or send the first feedback information to a terminal device.

* * * * *